United States Patent
Liu et al.

(10) Patent No.: US 11,405,899 B2
(45) Date of Patent: Aug. 2, 2022

(54) RESOURCE REQUEST SENDING METHOD, USER EQUIPMENT, AND BASE STATION

(71) Applicant: HUAWEI TECHNOLOGIES CO., LTD., Guangdong (CN)

(72) Inventors: Yun Liu, Shenzhen (CN); Jian Wang, Beijing (CN); Da Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 143 days.

(21) Appl. No.: 16/621,543

(22) PCT Filed: Jun. 16, 2017

(86) PCT No.: PCT/CN2017/088820
§ 371 (c)(1),
(2) Date: Dec. 11, 2019

(87) PCT Pub. No.: WO2018/227635
PCT Pub. Date: Dec. 20, 2018

(65) Prior Publication Data
US 2021/0289489 A1    Sep. 16, 2021

(51) Int. Cl.
*H04W 72/04*    (2009.01)

(52) U.S. Cl.
CPC ... *H04W 72/0413* (2013.01); *H04W 72/0446* (2013.01); *H04W 72/0453* (2013.01); *H04W 72/0466* (2013.01)

(58) Field of Classification Search
CPC ......... H04W 72/0413; H04W 72/0446; H04W 72/0453; H04W 72/0466
See application file for complete search history.

(56) References Cited

U.S. PATENT DOCUMENTS

| | | |
|---|---|---|
| 8,351,370 B2 | 1/2013 | Kim et al. |
| 9,288,798 B2 | 3/2016 | Han et al. |

(Continued)

FOREIGN PATENT DOCUMENTS

| | | |
|---|---|---|
| CN | 102150380 A | 8/2011 |
| WO | 2009022866 A1 | 2/2009 |
| WO | 2009045026 A2 | 4/2009 |

OTHER PUBLICATIONS

Extended European Search Report issued in European Application No. 17913942.3 dated Mar. 30, 2020, 8 pages.

(Continued)

*Primary Examiner* — Brian D Nguyen
(74) *Attorney, Agent, or Firm* — Fish & Richardson P.C.

(57) ABSTRACT

Embodiments of this application provide a resource request sending method, user equipment, and a base station, and relate to the communications field, to resolve a problem about how a short PUCCH carries an SR. The method includes: transmitting, by user equipment UE, a first sequence on a resource used to transmit physical uplink control signaling, to carry the physical uplink control signaling and indicate a resource request SR; or transmitting, by user equipment UE, physical uplink control signaling and indicating a resource request SR by using a first subcarrier group on a resource used to transmit the physical uplink control signaling. The embodiments of this application are applied to a scenario in which physical uplink control signaling carries an SR.

1 Claim, 12 Drawing Sheets

(56) References Cited

U.S. PATENT DOCUMENTS

| | | | |
|---|---|---|---|
| 2010/0040005 A1* | 2/2010 | Kim | H04J 11/0069 370/329 |
| 2012/0147843 A1* | 6/2012 | Pison | H04L 5/0044 370/330 |
| 2013/0010743 A1* | 1/2013 | Ahn | H04L 1/1864 370/329 |
| 2013/0121290 A1 | 5/2013 | Kim et al. | |
| 2013/0163532 A1* | 6/2013 | Anderson | H04W 72/1278 370/329 |
| 2013/0163533 A1* | 6/2013 | Anderson | H04W 72/1284 370/329 |
| 2014/0050185 A1 | 2/2014 | Hooli et al. | |
| 2015/0304089 A1* | 10/2015 | Kim | H04L 27/261 370/329 |
| 2016/0112977 A1* | 4/2016 | Byun | H04W 72/082 370/350 |
| 2016/0338103 A1* | 11/2016 | Martin | H04W 74/08 |
| 2018/0077718 A1* | 3/2018 | Nory | H04L 1/1854 |
| 2018/0146478 A1* | 5/2018 | Kim | H04W 4/06 |
| 2019/0098653 A9* | 3/2019 | Nory | H04L 5/0048 |
| 2019/0253221 A1* | 8/2019 | Kwon | H04L 5/0007 |
| 2020/0015225 A1* | 1/2020 | Matsumura | H04L 27/2607 |
| 2020/0059332 A1* | 2/2020 | Takeda | H04L 5/0094 |
| 2020/0100241 A1* | 3/2020 | Takeda | H04L 5/0005 |
| 2020/0106546 A1* | 4/2020 | Takeda | H04W 72/0413 |
| 2020/0195387 A1* | 6/2020 | Matsumura | H04L 1/1854 |
| 2020/0236700 A1* | 7/2020 | Matsumura | H04W 72/1284 |
| 2021/0160031 A1* | 5/2021 | Takeda | H04W 72/0413 |

OTHER PUBLICATIONS

PCT International Search Report and Written Opinion issued in International Application No. PCT/CN2017/088820 dated Feb. 26, 2018, 16 pages (with English translation).

Intel Corporation,"Short PUCCH formats for 1~2 UCI bits ",3GPP TSG RAN WG1 Meeting #89, R1-1707387, Hangzhou, China, May 15-19, 2017, 3 pages.

NTT Docomo Inc.,"Scheduling request design in NR system",3GPP TSG RAN WG1 Meeting #89,R1-1708480, Hangzhou, P.R. China, May 15-19, 2017, 3 pages.

Intel Corporation,"Enhancements to SR targeting low latency requirements",3GPP TSG RAN WG1 Meeting #89, R1-1707406, Hangzhou, P. R. China, May 15-19, 2017, 5 pages.

Intel Corporation,"Resource allocation for scheduling request",3GPP TSG RAN WG1 Meeting #89, R1-1707394, Hangzhou, P. R. China, May 15-19, 2017, 3 pages.

LG Electronics Inc.,"Scheduling Request (SR) design considering PUCCH structure",3GPP TSG RAN WG1 #50bis, R1-074205,Shanghai, China, Oct. 8-12, 2007, 6 pages.

Office Action issued in Chinese Application No. 201780049943.5 dated Mar. 4, 2020, 16 pages (With English Translation).

* cited by examiner

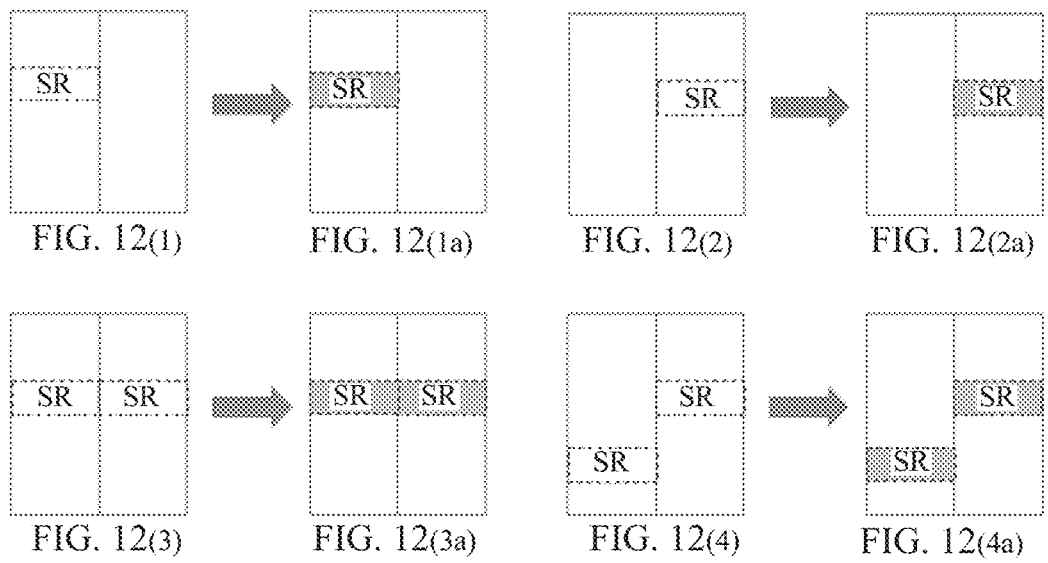
FIG. 12(1)  FIG. 12(1a)  FIG. 12(2)  FIG. 12(2a)
FIG. 12(3)  FIG. 12(3a)  FIG. 12(4)  FIG. 12(4a)
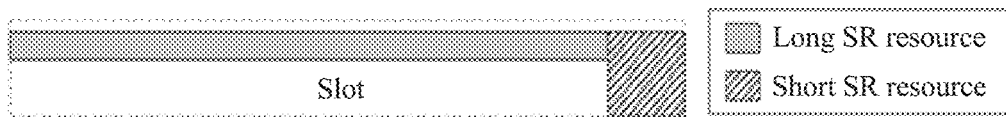
FIG. 13
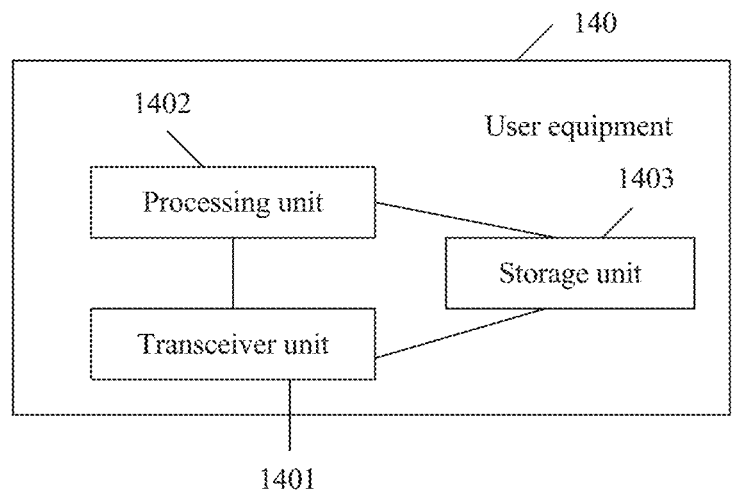
FIG. 14

RESOURCE REQUEST SENDING METHOD, USER EQUIPMENT, AND BASE STATION

CROSS-REFERENCE TO RELATED APPLICATIONS

This application is a national stage of International Application No. PCT/CN2017/088820, filed on Jun. 16, 2017, which is hereby incorporated by reference in its entirety.

TECHNICAL FIELD

This application relates to the communications field, and in particular, to a resource request sending method, user equipment, and a base station.

BACKGROUND

In the discussion about a 5th generation mobile communications technology (5-Generation mobile communications technology, 5G), a system structure and an access process that are achieved in 4G Long Term Evolution (Long Term Evolution, LTE) may be still used. On one hand, because a communications system is backward compatible, a later researched and developed new technology tends to be compatible with a previously standardized technology. On the other hand, because there are a large quantity of existing designs in 4G LTE, if flexibility of many technologies in 5G needs to be sacrificed to achieve compatibility with the designs in 4G LTE, performance of the 5G technology is reduced. Therefore, a technical discussion that parallel research is conducted for 4G and 5G without considering backward compatibility is proposed in 3GPP. A communications protocol based on this research is referred to as 5G new radio (New Radio, NR).

In the discussion about the 5G NR, a short uplink control channel/short physical uplink control signaling (short Physical Uplink Control Channel, short PUCCH) may be located in the last one to two symbols in each slot. As shown in FIG. 1, each slot may be divided into three parts. A first part is downlink control (Downlink Control, DL Control), may be used to transmit a downlink scheduling grant (DL grant) or an uplink scheduling grant (Uplink grant), and is used to indicate a resource configuration status of user equipment (User Equipment, UE). A second part is a data part, and may be used by a base station to transmit downlink data or used by UE to transmit uplink data based on a resource allocated in the UL grant. A third part is short physical uplink control signaling. On a resource of the short physical uplink control signaling, the UE may return an acknowledgement or negative acknowledgement (Acknowledgement/Negative Acknowledgement, ACK/NACK) for received downlink data, or the UE may transmit uplink channel state information (Channel State Information, CSI), to assist the base station in subsequent scheduling. The short physical uplink control signaling part may be occupied by uplink data.

A resource request (Scheduling Request, SR) is request signaling that is sent by the UE to the base station when the UE needs to perform uplink transmission, to obtain a time-frequency resource allocated by the base station. When receiving the SR sent by the UE, the base station sends downlink control signaling to the UE at appropriate time, where the downlink control signaling carries information about an allocated resource. Then, the UE performs uplink transmission on the resource allocated by the base station.

However, in a subframe design of the 5G NR, how a short PUCCH carries an SR is a problem urgently needing to be resolved.

SUMMARY

Embodiments of this application provide a resource request sending method, user equipment, and a base station, to resolve a problem about how a short PUCCH carries an SR.

According to a first aspect, a resource request sending method is provided. The resource request sending method includes: transmitting, by user equipment UE, a first sequence on a resource used to transmit physical uplink control signaling, to carry the physical uplink control signaling and indicate a resource request SR; or transmitting, by user equipment UE, physical uplink control signaling and indicating a resource request SR by using a first subcarrier group on a resource used to transmit the physical uplink control signaling. A frequency division manner may be used when the first sequence is used to carry the physical uplink control signaling, some subcarriers are used to carry a reference signal (Demodulated reference signal, DMRS) of the physical uplink control signaling, and the other subcarriers are used to carry uplink control information (Uplink control information, UCI) of the physical uplink control signaling. The physical uplink control signaling herein may be low-load short physical uplink control signaling (short PUCCH). When the first sequence is used, it may indicate that there is the physical uplink control signaling and the SR is indicated. Alternatively, a code division manner is used, that is, different subcarrier groups are used to indicate whether an SR is transmitted when the physical uplink control signaling is transmitted. The first subcarrier group is used to transmit the physical uplink control signaling and indicate the SR. In this way, a problem about how a short PUCCH carries an SR can be resolved.

In a possible implementation, the first sequence is different from a second sequence, and the second sequence is used to transmit the physical uplink control signaling; and a subcarrier location of the first subcarrier group is different from a subcarrier location of a second subcarrier group, and the second subcarrier group is used to transmit the physical uplink control signaling. To be specific, when the physical uplink control signaling is transmitted by using the second sequence, it indicates that no SR is transmitted simultaneously, and the second sequence is only used to transmit the physical uplink control signaling. Alternatively, when the physical uplink control signaling is transmitted by using the second subcarrier group, it indicates that no SR is transmitted simultaneously, and the second subcarrier group is only used to transmit the physical uplink control signaling.

In a possible implementation, before the transmitting, by user equipment UE, a first sequence on a resource used to transmit physical uplink control signaling, to carry the physical uplink control signaling and indicate an SR, the method further includes: receiving, by the UE, first signaling sent by a base station, and receiving second signaling sent by the base station, where the first signaling includes the first sequence that is configured by the base station and that is used to transmit the physical uplink control signaling and indicate the SR, the first sequence includes a sequence 1 and a sequence 2, the sequence 1 is used to carry reference information DMRS of the physical uplink control signaling, and the sequence 2 is used to carry uplink control information of the physical uplink control signaling; the second signaling includes the second sequence that is configured by the base station and that is used to transmit the physical uplink control signaling, the second sequence includes a sequence 3 and a sequence 4, the sequence 3 is used to carry the DMRS, and the sequence 4 is used to carry the uplink control information; and the sequence 1 is different from the sequence 3, or the sequence 2 is different from the sequence 4, the sequence 1 and the sequence 2 are located at different subcarrier locations, and the sequence 3 and the sequence 4 are located at different subcarrier locations. To be specific, when the physical uplink control signaling is transmitted by using the sequence 1 and the sequence 2 on the resource of the physical uplink control signaling, it indicates that the SR is transmitted, or when the physical uplink control signaling is transmitted by using the sequence 3 and the sequence 4 on the resource of the physical uplink control signaling, it indicates that no SR is transmitted.

In a possible implementation, the transmitting, by UE, a first sequence on a resource used to transmit physical uplink control signaling, to carry the physical uplink control signaling and indicate an SR includes: transmitting, by the UE, the physical uplink control signaling and indicating the SR by using the sequence 1 and the sequence 2 on the resource used to transmit the physical uplink control signaling.

In a possible implementation, before the transmitting, by UE, physical uplink control signaling and indicating an SR by using a first subcarrier group on a resource used to transmit the physical uplink control signaling, the method further includes: receiving, by the UE, third signaling sent by the base station, and receiving fourth signaling sent by the base station, where the third signaling includes the first subcarrier group that is configured by the base station and that is used to transmit the physical uplink control signaling and indicate the SR; and the fourth signaling includes the second subcarrier group that is configured by the base station and that is used to transmit the physical uplink control signaling.

According to another aspect, a resource request sending method is provided. The resource request sending method includes: configuring, by a base station, a first sequence for user equipment UE, where the first sequence is used to carry physical uplink control signaling and indicate an SR, so that the base station receives the physical uplink control signaling that is transmitted by the UE and the SR that is indicated by the UE by using the first sequence on a resource used to transmit the physical uplink control signaling; or configuring, by a base station, a first subcarrier group for UE, where the first subcarrier group is used to transmit physical uplink control signaling and indicate an SR, so that the base station receives the physical uplink control signaling that is transmitted by the UE and the SR that is indicated by the UE by using the first subcarrier group on a resource used to transmit the physical uplink control signaling.

In a possible implementation, the first sequence is different from a second sequence, and the second sequence is used to transmit the physical uplink control signaling; and a subcarrier location of the first subcarrier group is different from a subcarrier location of a second subcarrier group, and the second subcarrier group is used to transmit the physical uplink control signaling.

In a possible implementation, the configuring, by a base station, a first sequence for UE includes: sending, by the base station, first signaling to the UE, where the first signaling includes the first sequence that is configured by the base station and that is used to carry the physical uplink control signaling and indicate the SR, the first signaling is used to instruct the UE to transmit the physical uplink control signaling and indicate the SR by using the first sequence on the resource used to transmit the physical uplink control signaling, the first sequence includes a sequence 1 and a sequence 2, the sequence 1 is used to carry reference information DMRS of the physical uplink control signaling, and the sequence 2 is used to carry uplink control information of the physical uplink control signaling; and before the base station receives the SR and the physical uplink control signaling, the method further includes: sending, by the base station, second signaling to the UE, where the second signaling includes the second sequence that is configured by the base station and that is used to transmit the physical uplink control signaling and indicate the SR, the second sequence includes a sequence 3 and a sequence 4, the sequence 3 is used to carry the DMRS, and the sequence 4 is used to carry the uplink control information, where the sequence 1 is different from the sequence 3, or the sequence 2 is different from the sequence 4, the sequence 1 and the sequence 2 are located at different subcarrier locations, and the sequence 3 and the sequence 4 are located at different subcarrier locations.

In a possible implementation, the configuring, by a base station, a first subcarrier group for UE includes: sending, by the base station, third signaling to the UE, where the third signaling includes the first subcarrier group that is configured by the base station and that is used to transmit the physical uplink control signaling and indicate the SR, and the third signaling is used to instruct the UE to transmit the physical uplink control signaling and indicate the SR by using the first subcarrier group on the resource used to transmit the physical uplink control signaling; and before the base station receives the physical uplink control signaling and the indicated SR, the method further includes: sending, by the base station, fourth signaling to the UE, where the fourth signaling includes the second subcarrier group that is configured by the base station and that is used to transmit the physical uplink control signaling, and the fourth signaling is used to instruct the UE to transmit the physical uplink control signaling by using the second subcarrier group on the resource used to transmit the physical uplink control signaling.

According to still another aspect, a resource request sending method is provided. The resource request sending method includes: transmitting, by user equipment UE, an SR by using a first sequence on a subcarrier group that includes subcarriers having a preset gap, where the preset gap includes X subcarriers, and X is a positive integer greater than or equal to 2. This method may be applied to a scenario in which the UE transmitting the SR transmits the SR by reusing a resource that is used by other UE to transmit a short PUCCH, and specifically, a resource of a DMRS of the short PUCCH may be reused to transmit the SR. For the DMRS of the short PUCCH, one subcarrier in every N+1 consecutive subcarriers is used to carry the DMRS, and the other N subcarriers are used to carry a UCI signal. Therefore, a subcarrier reused for the SR may be understood as the subcarrier group that includes the subcarriers having the preset gap. To distinguish between a sequence used by the other UE to transmit an SR and a sequence used to transmit a DMRS of a short PUCCH, the UE transmits the SR by using the first sequence, to resolve a problem about how a short PUCCH carries an SR for transmission.

In a possible implementation, the first sequence is different from a sequence that is used by other UE in a UE group of the UE to transmit the SR on the subcarriers, and the subcarrier group includes a subcarrier occupied for transmitting a reference signal DMRS of physical uplink control signaling.

In a possible implementation, before the transmitting, by UE, an SR by using a first sequence on a subcarrier group that includes subcarriers having a preset gap, the method further includes: receiving, by the UE, signaling sent by a base station, where the signaling includes a frequency domain resource and the first sequence that are used by the UE to transmit the SR, and the frequency domain resource includes the subcarrier group.

According to yet another aspect, a resource request sending method is provided. The resource request sending method includes: configuring, by a base station for user equipment UE, a subcarrier group and a first sequence that are used by the UE to transmit a resource request SR, where the subcarrier group includes subcarriers having a preset gap, the preset gap includes X subcarriers, and X is a positive integer greater than or equal to 2; and receiving, by the base station, the SR that is transmitted by the UE by using the first sequence on the subcarrier group.

In a possible implementation, the first sequence is different from a sequence that is used by other UE in a UE group of the UE to transmit the SR on the subcarrier group, and the subcarrier group includes a subcarrier occupied for transmitting a reference signal DMRS of physical uplink control signaling.

In a possible implementation, the configuring, by a base station for user equipment UE, a subcarrier group and a first sequence that are used by the UE to transmit a resource request SR includes: sending, by the base station, signaling to the UE, where the signaling includes a frequency domain resource and the first sequence that are used by the UE to transmit the SR, and the frequency domain resource includes the subcarrier group.

According to yet another aspect, a resource request sending method is provided, where a resource used to transmit physical uplink control signaling or a resource used to transmit an SR occupies two symbols, the two symbols include a first symbol and a second symbol, and the method includes: when a first resource request SR resource is configured in the first symbol, and there is a second SR resource in the second symbol, transmitting, by user equipment UE, the SR by using the first SR resource in the first symbol and the second SR resource in the second symbol; or when a first SR resource is configured in the first symbol, and there is a second SR resource in the second symbol, transmitting, by user equipment UE, the physical uplink control signaling and indicating the SR by using the first SR resource in the first symbol and the second SR resource in the second symbol; or when a first SR resource is configured in the first symbol, and there is a second SR resource in the second symbol, transmitting, by user equipment UE, the physical uplink control signaling and indicating the SR by using the first SR resource in the first symbol, and transmitting the physical uplink control signaling on a first resource in the second symbol, where frequency domain resources or code domain resources in the first resource and the second SR resource are different; or when a first SR resource is configured in the first symbol, transmitting, by user equipment UE, the physical uplink control signaling and indicating the SR by using the first SR resource in the first symbol, and transmitting the physical uplink control signaling on a first resource in the second symbol. This method is used to resolve a problem about how to carry an SR for transmission when two symbols in time domain are occupied to transmit a short PUCCH. It can be learned that the UE may transmit the SR based on the SR resources reserved in the two symbols; or the UE may transmit the physical uplink control signaling and indicate that the SR is transmitted, on the SR resources reserved in the two symbols; or the SR resource is configured in one of the two symbols, and the physical uplink control signaling is transmitted and the SR is indicated on the reserved SR resource, and the physical uplink control signaling is transmitted in the other symbol or the SR resources are reserved in the two symbols, the physical uplink control signaling is transmitted and the SR is indicated on the SR resource in one symbol, and the physical uplink control signaling is transmitted in the other symbol.

In a possible implementation, if the UE transmits the physical uplink control signaling and indicates the SR by using the first SR resource in the first symbol and the second SR resource in the second symbol, before the transmitting, by the UE, the physical uplink control signaling and indicating the SR, the method further includes: receiving, by the UE, first signaling sent by a base station, where the first signaling is used to indicate the first SR resource in the first symbol and the second SR resource in the second symbol to the UE, and a frequency domain resource in the first SR resource in the first symbol is the same as or different from a frequency domain resource in the second SR resource in the second symbol.

In a possible implementation, if the UE transmits the physical uplink control signaling and indicates the SR on the first SR resource in the first symbol, and transmits the physical uplink control signaling on the first resource in the second symbol, before the transmitting, by the UE, the physical uplink control signaling and indicating the SR, the method further includes: receiving, by the UE, second signaling sent by a base station, where the second signaling is used to indicate that the first SR resource is configured in the first symbol, or that the first SR resource is configured in the first symbol and the second SR resource is configured in the second symbol, where when the first SR resource is configured in the first symbol and the second SR resource is configured in the second symbol, a frequency domain resource in the first SR resource in the first symbol is the same as or different from a frequency domain resource in the second SR resource in the second symbol.

In a possible implementation, the second signaling is further used to indicate that the first resource includes a resource configured by the base station, or that a frequency domain gap between the first resource and the first SR resource in the first symbol is a first frequency domain gap, the first frequency domain gap is the same as a second frequency domain gap, and the second frequency domain gap is a frequency domain gap between a frequency domain resource in the second symbol and a frequency domain resource in the first symbol in frequency domain resources that are indicated by the base station and that are used to transmit the physical uplink control signaling.

In a possible implementation, if the UE transmits the SR in the first symbol and on the second SR resource in the second symbol, before the transmitting, by the UE, the SR, the method further includes: receiving, by the UE, third signaling sent by a base station, where the third signaling is used to indicate the first SR resource in the first symbol, where if the third signaling is used to indicate the first SR resource in the first symbol, the third signaling is further used to instruct the UE to obtain the second SR resource in the second symbol based on the first SR resource in the first symbol according to a preset method.

According to yet another aspect, a resource request sending method is provided, where a resource used to transmit physical uplink control signaling occupies two symbols, the two symbols include a first symbol and a second symbol, and the method includes: transmitting, by user equipment UE, the physical uplink control signaling and indicating a resource request SR on a first resource in the first symbol and a second resource in the second symbol, where a range of a frequency domain resource in the first resource is the same as a range of a frequency domain resource that is used to transmit the physical uplink control signaling in the second symbol, and a range of a frequency domain resource in the second resource is the same as a range of a frequency domain resource that is used to transmit the physical uplink control signaling in the first symbol. This method may be applied to a case in which no SR resource is reserved in the two symbols occupied by the resource used to transmit the physical uplink control signaling. To indicate whether an SR is transmitted when the physical uplink control signaling is transmitted, when no SR is transmitted, the UE may transmit the physical uplink control signaling in the range of the frequency domain resource used to transmit the physical uplink control signaling in the first symbol and the range of the frequency domain resource used to transmit the physical uplink control signaling in the second symbol, or when the SR is transmitted, to indicate that the SR is transmitted when the physical uplink control signaling is transmitted, the UE may transmit the physical uplink control signaling and indicate the SR on the first resource in the first symbol and the second resource in the second symbol, where the range of the frequency domain resource in the first resource is the same as the range of the frequency domain resource used to transmit the physical uplink control signaling in the second symbol, and the range of the frequency domain resource in the second resource is the same as the range of the frequency domain resource used to transmit the physical uplink control signaling in the first symbol, to resolve a problem about how a short PUCCH occupying two symbols carries an SR for transmission.

In a possible implementation, before the transmitting, by UE, the physical uplink control signaling and indicating an SR, the method further includes: receiving, by the UE, signaling sent by a base station, where the signaling is used to indicate the first resource in the first symbol and the second resource in the second symbol that are used by the UE to transmit the physical uplink control signaling and indicate the SR.

According to yet another aspect, a resource request sending method is provided. The resource request sending method includes: configuring, by a base station for user equipment UE, a resource used to transmit a resource request SR, where the resource of the SR includes a resource in at least one of a first symbol and a second symbol, and the first symbol and the second symbol are two symbols that are used to transmit physical uplink control signaling or the SR in one slot; and receiving, by the base station, the SR sent by the UE.

In a possible implementation, before the receiving, by the base station, the SR sent by the UE, the method further includes: sending, by the base station, first signaling to the UE, where the first signaling includes the resource of the SR, and the resource of the SR includes the resource in at least one of the first symbol and the second symbol.

In a possible implementation, if the resource of the SR includes a resource in the first symbol, the first signaling is further used to instruct the UE to obtain a reserved resource of the SR in the second symbol based on the reserved resource of the SR in the first symbol according to a preset method.

According to yet another aspect, a resource request sending method is provided, where a first-format resource request SR resource and a second-format SR resource are configured in a slot, a quantity of symbols occupied by the second-format SR resource is greater than a quantity of symbols occupied by the first-format SR resource, and the method includes: transmitting, by user equipment UE, an SR on the second-format SR resource; or if physical uplink control signaling is transmitted in the symbol of the second-format SR resource, and a format of the physical uplink control signaling can carry or indicate an SR, transmitting, by UE, the physical uplink control signaling and carrying or indicating the SR on the second-format SR resource; or if physical uplink control signaling is transmitted in the symbol of the second-format SR resource, and a format of the physical uplink control signaling cannot carry or indicate an SR, transmitting, by UE, the SR on the first-format SR resource. For example, the second-format SR resource occupies 4 to 14 symbols, and the first-format SR resource occupies 1 to 2 symbols. The first-format SR resource is located in two symbols used to transmit the physical uplink control signaling. A resource of the physical uplink control signaling is further configured in the slot, the physical uplink control signaling is first-format physical uplink control signaling or second-format physical uplink control signaling, a quantity of symbols occupied by a resource of the second-format physical uplink control signaling is greater than a quantity of symbols occupied by a resource of the first-format physical uplink control signaling, and the physical uplink control signaling transmitted in the symbol of the second-format SR resource is the second-format physical uplink control signaling.

In a possible implementation, before the transmitting, by user equipment UE, a resource request SR, the method further includes: receiving, by the UE, first signaling sent by a base station, where the first signaling includes the first-format SR resource and the second-format SR resource; and receiving, by the UE, second signaling sent by the base station, where if the second signaling is used to indicate to the UE that no physical uplink control signaling is transmitted on the second-format SR resource, the UE transmits the SR on the second-format SR resource; or if the physical uplink control signaling is transmitted on the second-format SR resource and the physical uplink control signaling can carry or indicate the SR, the UE transmits the physical uplink control signaling and carries or indicates the SR on the second-format SR resource; or if the physical uplink control signaling is transmitted on the second-format SR resource and the physical uplink control signaling cannot carry or indicate the SR, the UE transmits the SR on the first-format SR resource.

According to yet another aspect, a resource request sending method is provided. The resource request sending method includes: if there is a first-format resource request SR resource in a slot, physical uplink control signaling is transmitted in the slot, and the physical uplink control signaling cannot carry or indicate an SR, transmitting, by user equipment UE, the physical uplink control signaling on a resource of the physical uplink control signaling, and transmitting the SR on the first-format SR resource.

In a possible implementation, before the transmitting, by UE, the SR, the method further includes: receiving, by the UE, first signaling sent by a base station, where the first signaling includes the first-format SR resource, and a symbol occupied by the first-format SR resource is the same as or partially the same as a symbol occupied by the resource of the physical uplink control signaling; and receiving, by the UE, second signaling sent by the base station, where if the second signaling is used to indicate that the physical uplink control signaling cannot carry or indicate the SR, the UE transmits the SR on the first-format SR resource.

According to yet another aspect, a resource request sending method is provided. The resource request sending method includes: if there are a resource of first-format physical uplink control signaling and a resource of second-format physical uplink control signaling in a slot, and a quantity of symbols occupied by the resource of the second-format physical uplink control signaling is greater than a quantity of symbols occupied by the resource of the first-format physical uplink control signaling, determining, by user equipment UE based on whether the first-format physical uplink control signaling and the second-format physical uplink control signaling can carry or indicate a resource request SR, to carry or indicate the SR on the resource of the first-format physical uplink control signaling or the resource of the second-format physical uplink control signaling.

In a possible implementation, the determining, by UE based on whether the first-format physical uplink control signaling and the second-format physical uplink control signaling carry or indicate an SR, to carry or indicate the SR on the resource of the first-format physical uplink control signaling or the resource of the second-format physical uplink control signaling includes: if the first-format physical uplink control signaling can carry or indicate the SR, and the second-format physical uplink control signaling cannot carry or indicate the SR, transmitting, by the UE, the first-format physical uplink control signaling and carrying or indicating the SR on the resource of the first-format physical uplink control signaling; or if the first-format physical uplink control signaling can carry or indicate the SR, and the second-format physical uplink control signaling can carry or indicate the SR, transmitting, by the UE, the first-format physical uplink control signaling and carrying or indicating the SR on the resource of the first-format physical uplink control signaling, or transmitting, by the UE, the second-format physical uplink control signaling and carrying or indicating the SR on the resource of the second-format physical uplink control signaling; or if the first-format physical uplink control signaling cannot carry the SR, and the second-format physical uplink control signaling can carry the SR, transmitting, by the UE, the second-format physical uplink control signaling and carrying or indicating the SR on the resource of the second-format physical uplink control signaling.

In a possible implementation, before the determining, by UE, to carry or indicate the SR, the method further includes: receiving, by the UE, signaling sent by a base station, where if the signaling is used to indicate to the UE that there are the resource of the first-format physical uplink control signaling and the resource of the second-format physical uplink control signaling in the slot, the UE determines, based on whether the first-format physical uplink control signaling and the second-format physical uplink control signaling can carry the SR, to carry or indicate the SR on the resource of the first-format physical uplink control signaling or the resource of the second-format physical uplink control signaling, where the first-format physical uplink control signaling and the second-format physical uplink control signaling are located in a same slot.

According to yet another aspect, a resource request sending method is provided. The resource request sending method includes: configuring, by a base station, a first-format resource request SR resource, a second-format SR resource, a resource of first-format physical uplink control signaling, and a resource of second-format physical uplink control signaling for user equipment UE, where a quantity of symbols occupied by the second-format SR resource is greater than a quantity of symbols occupied by the first-format SR resource, and a quantity of symbols occupied by the resource of the second-format physical uplink control signaling is greater than a quantity of symbols occupied by the resource of the first-format physical uplink control signaling; and receiving, by the base station, an SR that is sent by the UE on the second-format SR resource, or receiving, by the base station, an SR that is sent by the UE on the first-format SR resource, or receiving, by the base station, the second-format physical uplink control signaling that is sent by the UE and an SR that is carried or indicated by the UE on the resource of the second-format physical uplink control signaling, or receiving, by the base station, the first-format physical uplink control signaling that is sent by the UE and an SR that is carried or indicated by the UE on the resource of the first-format physical uplink control signaling.

In a possible implementation, before the receiving, by the base station, an SR, the method further includes: sending, by the base station, first signaling to the UE, where if the first signaling is used to indicate that physical uplink control signaling is transmitted on the second-format SR resource and the physical uplink control signaling can carry or indicate the SR, the UE transmits the second-format physical uplink control signaling and carries or indicates the SR on the second-format SR resource; or if the first signaling is used to indicate that the second-format physical uplink control signaling is transmitted on the second-format SR resource and the second-format physical uplink control signaling cannot carry the SR, the UE transmits the SR on the first-format SR resource; or sending, by the base station, second signaling to the UE, where if the second signaling is used to indicate to the UE that the first-format physical uplink control signaling cannot carry or indicate the SR, the UE transmits the first-format physical uplink control signaling and the SR on the resource of the first-format physical uplink control signaling in different frequency domain transmission manners; or sending, by the base station, third signaling to the UE, where if the third signaling is used to indicate to the UE that there are the resource of the second-format physical uplink control signaling and the resource of the first-format physical uplink control signaling in a slot, the UE determines, based on whether the second-format physical uplink control signaling and the first-format physical uplink control signaling can carry or indicate the SR, to transmit the SR on the resource of the second-format physical uplink control signaling or the resource of the first-format physical uplink control signaling.

According to yet another aspect, user equipment (UE) is provided, where the user equipment includes a processor and a transceiver, the processor is configured to support the user equipment in performing corresponding functions in the foregoing methods, and the transceiver is configured to support communication between the UE and a base station.

According to yet another aspect, a base station is provided, where the base station includes a processor and a transceiver, the processor is configured to support the base station in performing corresponding functions in the foregoing methods, and the transceiver is configured to support communication between the base station and user equipment UE.

According to yet another aspect, an embodiment of this application provides a computer storage medium, configured to store a computer software instruction used by the foregoing base station and/or user equipment, where the computer software instruction includes a program designed for performing the foregoing aspect.

According to yet another aspect, an embodiment of this application provides a computer program product including an instruction. When the instruction runs on a computer, the computer performs the methods in the foregoing aspects.

BRIEF DESCRIPTION OF DRAWINGS

FIG. 12(1) to FIG. 12(4a) are a schematic diagram of frequency domain resources of an SR when the SR is transmitted but a short PUCCH is not transmitted in two symbols according to an embodiment of this application;

FIG. 13 is a schematic diagram of resources when there are a long PUCCH and a short PUCCH in one slot according to an embodiment of this application;

FIG. 14 is a schematic structural diagram of user equipment according to an embodiment of this application;

DESCRIPTION OF EMBODIMENTS

Figure 1:
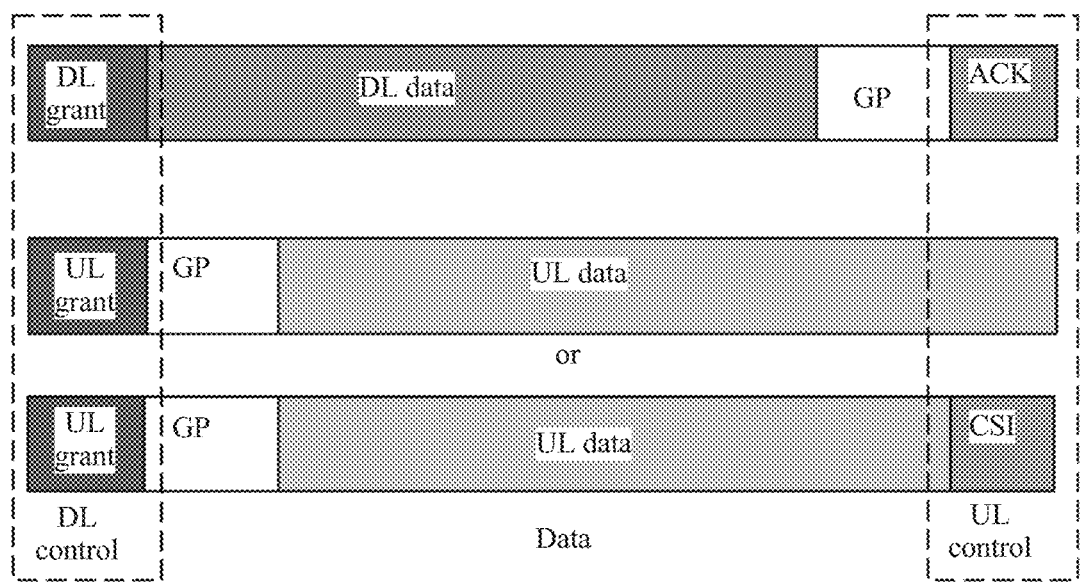
FIG. 1 is a schematic structural diagram of a subframe of short physical uplink control signaling according to an embodiment of this application.

For ease of understanding, example descriptions of some concepts related to this application are provided for reference. Details are as follows:

A physical uplink control channel/physical uplink control signaling (Physical uplink control channel, PUCCH) is used to transmit uplink control information such as a reference signal (Demodulated reference signal, DMRS), uplink control information (Uplink control information. UCI), and an acknowledgement/negative acknowledgement (Acknowledge/Negative acknowledge, ACC/NACK).

A resource request (Scheduling request, SR) is request signaling that is sent by UE to a base station when the UE needs to perform uplink transmission, to obtain a time-frequency resource allocated by the base station. When receiving the SR sent by the UE, the base station sends downlink control signaling to the UE at appropriate time, where the downlink control signaling carries information about an allocated resource. Then, the UE performs uplink transmission on the resource allocated by the base station.

For first-format physical uplink control signaling and second-format physical uplink control signaling, the first-format physical uplink control signaling may be understood as short physical uplink control signaling (short PUCCH), and the second-format physical uplink control signaling may be understood as long physical uplink control signaling (long PUCCH). A quantity of symbols in a resource occupied by the short PUCCH in one slot is different from a quantity of symbols in a resource occupied by the long PUCCH in the slot, and the quantity of symbols in the resource occupied by the long PUCCH is greater than the quantity of symbols in the resource occupied by the short PUCCH. For example, the resource occupied by the long PUCCH includes 4 to 14 symbols, and the resource occupied by the short PUCCH includes 1 to 2 symbols.

For a first-format short PUCCH and a second-format short PUCCH, bit information of the first-format short PUCCH is less than bit information occupied by the second-format short PUCCH.

For an SR resource, a first-format SR resource and a second-format SR resource are allocated in one slot. The first-format SR resource may be understood as a short-SR resource, and the second-format SR resource may be understood as a long-SR resource. A quantity of symbols in a resource occupied by the first-format SR resource in one slot is different from a quantity of symbols in a resource occupied by the second-format SR resource in the slot, and the quantity of symbols occupied by the second-format SR resource is greater than the quantity of symbols occupied by the first-format SR resource. For example, the second-format SR resource may occupy 4 to 14 symbols, and the first-format SR resource may occupy 1 to 2 symbols.

A physical resource block (Physical resource block, PRB) includes a plurality of consecutive subcarriers in a frequency domain resource. For example, one PRB includes 12 consecutive subcarriers in the frequency domain resource.

The embodiments of this application may be applied to a case about how to carry an SR in a subframe design of 5G NR when UE needs to transmit the SR in a slot and if there is the second-format physical uplink control signaling or the first-format physical uplink control signaling in the slot.

Figure 2:
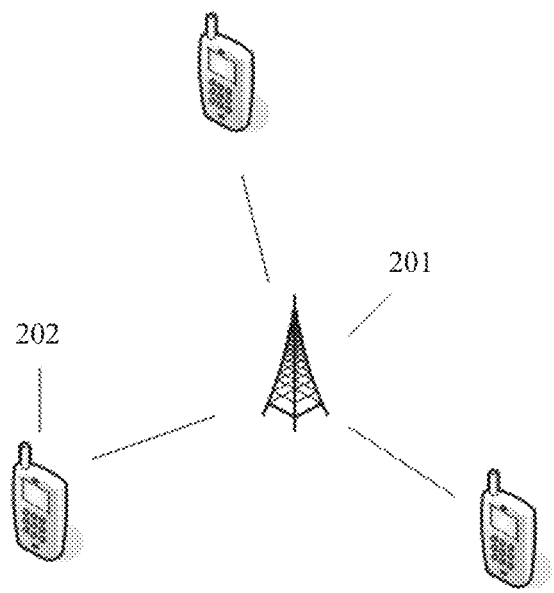
FIG. 2 is a schematic diagram of a network structure according to an embodiment of this application.

A network architecture of this application may include a base station 201 and UE 202, as shown in FIG. 2.

A base station (Base Station, BS) device may be alternatively referred to as a base station, and is an apparatus that is deployed in a radio access network to provide a wireless communication function. For example, in a 2G network, a device providing a base station function includes a base transceiver station (Base Transceiver Station, BTS) and a base station controller (Base Station Controller, BSC); in a 3G network, a device providing a base station function includes a NodeB (NodeB) and a radio network controller (Radio Network Controller, RNC); in a 4G network, a device providing a base station function includes an evolved NodeB (evolved NodeB, eNB); and in a wireless local area network (Wireless Local Area. Network, WLAN), a device providing a base station function is an access point (Access Point, AP). In a 5G communications system, a device providing a base station function includes an eNB, a new radio NodeB (New Radio NodeB, gNB), a centralized unit (Centralized Unit, CU), a distributed unit (Distributed Unit), a new radio controller, and the like.

User equipment UE is a terminal device, and may be a mobile terminal device, or may be a non-mobile terminal device. The device is mainly configured to receive or send service data. The user equipment may be distributed in a network, and user equipments in different networks have different names, for example, a terminal, a mobile station, a subscriber unit, a station, a cellular phone, a personal digital assistant, a wireless modem, a wireless communications device, a handheld device, a laptop computer, a cordless phone, and a wireless local loop station. The user equipment may communicate with one or more core networks through a radio access network (radio access network, RAN for short) (an access part in a wireless communications network), for example, exchange voice and/or data with the radio access network.

For a technical problem to be resolved in the embodiments of this application, different cases are described below by using four embodiments.

Embodiment 1

Embodiment 1 of this application discusses a case about how a first-format short PUCCH carries an SR, and cases of transmitting a short PUCCH in a frequency division (FDMed) or code division (CDMed) manner and carrying or indicating an SR when an SR resource is reserved or not reserved.

1. A first-format short PUCCH transmitted in a frequency division manner carries an SR.

The frequency division herein means that in a PRB in which the first-format short PUCCH is located, some subcarriers are used to carry a signal of a reference signal (Demodulated reference signal, DMRS), and other subcarriers are used to carry a signal of uplink control information UCI.

An implementation in which the first-format short PUCCH transmitted in the frequency division manner carries the SR may be discussed in the following two cases.

a. An SR resource is reserved in a slot.

When a base station and UE exchange signaling, the base station allocates a resource including time domain, frequency domain, and code domain to the UE. The resource is periodically allocated, that is, the resource is allocated to the UE at an interval of a fixed time period. The resource is the SR resource. When the UE needs to send an uplink SR, the UE transmits the uplink SR on the SR resource in each period. Particularly, the SR is transmitted with reference to a transmission format of the short PUCCH, that is, a DMRS and UCI are transmitted in the frequency division manner. Information carried in the UCI is information about the resource request, or information carried in the UCI is a value, and the value is stipulated in a standard.

The SR resource is reserved in the slot. In one time domain symbol, when the UE needs to transmit both the first-format short PUCCH and the SR, the UE transmits the first-format short PUCCH on the SR resource; when the UE needs to transmit only the first-format short PUCCH, the UE transmits the first-format short PUCCH on a resource that is allocated by the base station for transmitting the first-format short PUCCH, where the resource for transmitting the first-format short PUCCH is different from the SR resource, and the two resources are located at different frequency domain locations.

b. No SR resource is reserved in a slot.

No SR resource is reserved in the slot. When the UE needs to transmit the first-format short PUCCH, the UE selects, based on whether an SR needs to be transmitted, a corresponding sequence in the first-format short PUCCH on a resource for transmitting the first-format short PUCCH, so as to perform transmission.

Optionally, when the UE determines that the SR needs to be transmitted, the UE transmits a first sequence on a resource used to transmit physical uplink control signaling, to carry the physical uplink control signaling and indicate the SR, where the first sequence is used to transmit the physical uplink control signaling and indicate the SR.

In a possible implementation, the first sequence is different from a second sequence, and the second sequence is used to transmit the physical uplink control signaling.

Before the UE transmits the first sequence on the resource used to transmit the physical uplink control signaling, to carry the physical uplink control signaling and indicate the resource request SR, the method further includes:

receiving, by the UE, first signaling sent by the base station, and receiving second signaling sent by the base station.

The first signaling includes the first sequence that is configured by the base station and that is used to transmit the physical uplink control signaling and indicate the SR, the first sequence includes a sequence 1 and a sequence 2, the sequence 1 is used to carry reference information DMRS of the physical uplink control signaling, and the sequence 2 is used to carry uplink control information UCI of the physical uplink control signaling.

The second signaling includes a time-frequency resource and the second sequence that are configured by the base station and that are used to transmit the physical uplink control signaling, the second sequence includes a sequence 3 and a sequence 4, the sequence 3 is used to carry the DMRS, and the sequence 4 is used to carry the uplink control information.

The sequence 1 is different from the sequence 3, the sequence 2 is different from the sequence 4, a subcarrier location of the sequence 1 is different from a subcarrier location of the sequence 2, and a subcarrier location of the sequence 3 is different from a subcarrier location of the sequence 4. Optionally, the sequence 1 is equal to the sequence 2.

Therefore, when the UE needs to transmit the SR, the UE transmits the physical uplink control signaling by using the sequence 1 and the sequence 2 on the time-frequency resource used to transmit the physical uplink control signaling, or when the UE does not transmit the SR, the UE transmits the physical uplink control signaling by using the sequence 3 and the sequence 4 on a time-frequency resource used to transmit short physical uplink control signaling.

The foregoing physical uplink control signaling is the foregoing first-format short PUCCH.

The following describes, by way of example, a case in which no SR resource is reserved in a slot, and a first-format short PUCCH transmitted in a frequency division manner by using one or more PRBs carries an SR.

Figure 3:
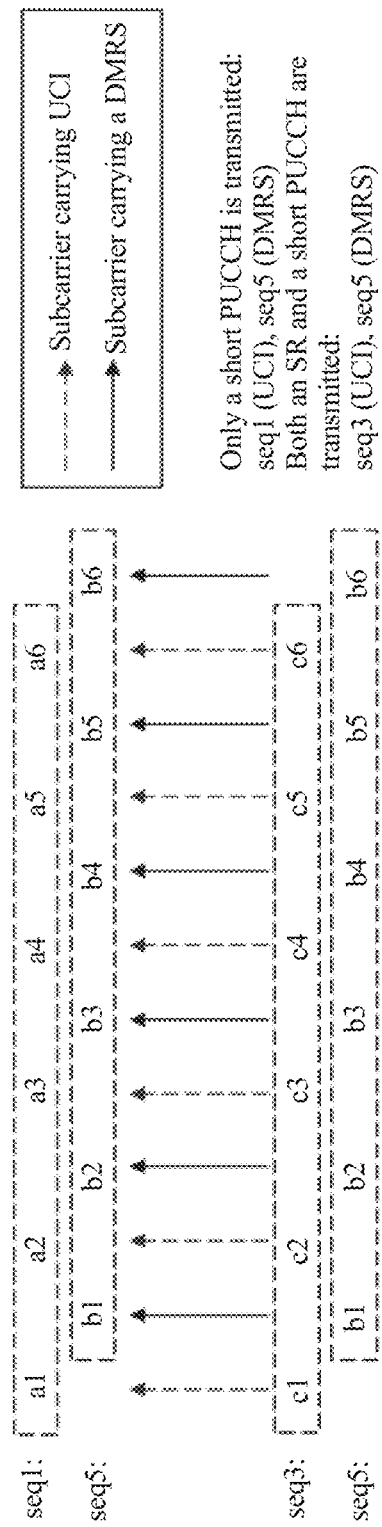
FIG. 3 is a schematic diagram of distribution of subcarriers used to carry UCI and a DMRS in one PRB according to an embodiment of this application.

As shown in FIG. 3, one PRB includes 12 subcarriers. A DMRS and UCI in the first-format short PUCCH each occupy six subcarriers. In this case, a sequence group having orthogonal sequences and having a length of 6 is used on every six subcarriers, and the sequence group is marked as {seq1, seq2, seq3, seq4, seq5, seq6}. A sequence on the subcarriers used to transmit the DMRS and a sequence on the subcarriers used to transmit the UCI form one sequence group. A sequence group is used when only the first-format short PUCCH is carried, another sequence group is used when both the first-format short PUCCH and the SR are carried, and the two sequence groups are different. In FIG. 3, for particular UE, when only the first-format short PUCCH is transmitted, the UCI is carried by using the sequence seq1, and the DMRS is carried by using the sequence seq5, or when both the first-format short PUCCH and the SR are carried, the UCI is carried by using the sequence seq3, and the DMRS is carried by using the sequence seq5.

On a receive side, that is, on a base station side, after receiving a symbol corresponding to the first-format short PUCCH, the base station performs discrete Fourier transform (Discrete Fourier Transform, DFT) on the first-format short PUCCH, multiplies, by a corresponding sequence, the corresponding subcarriers carrying the DMRS, to obtain channel estimation, and multiplies, by the sequence, the corresponding subcarriers carrying the UCI, to detect whether an SR is transmitted. For example, if a result of multiplying the subcarriers by the seq1 is greater than a result of multiplying the subcarriers by the seq3, the base station side determines that the UE transmits only the first-format short PUCCH, or if a result of multiplying the subcarriers by the seq3 is greater than a result of multiplying the subcarriers by the seq1, the base station side determines that the UE transmits the first-format short PUCCH and carries or indicates the SR.

According to the embodiment shown in FIG. 3, the PRB can be used by four UEs at the same time, to transmit first-format short PUCCHs and carry or indicate SRs. For example, {seqi, seqx, seqy} is set as one sequence group, and is respectively corresponding to sequences used in three cases: {only a DMRS is transmitted, only a first-format short PUCCH is transmitted, both an SR and a first-format short PUCCH are transmitted}.

Sequence groups used by the UEs are: UE1 {seq5, seq1, seq3}, UE2 {seq2, seq4, seq6}, UE3 {seq3, seq5, seq1}, and UE4 {seq4, seq6, seq2}.

Figure 4:
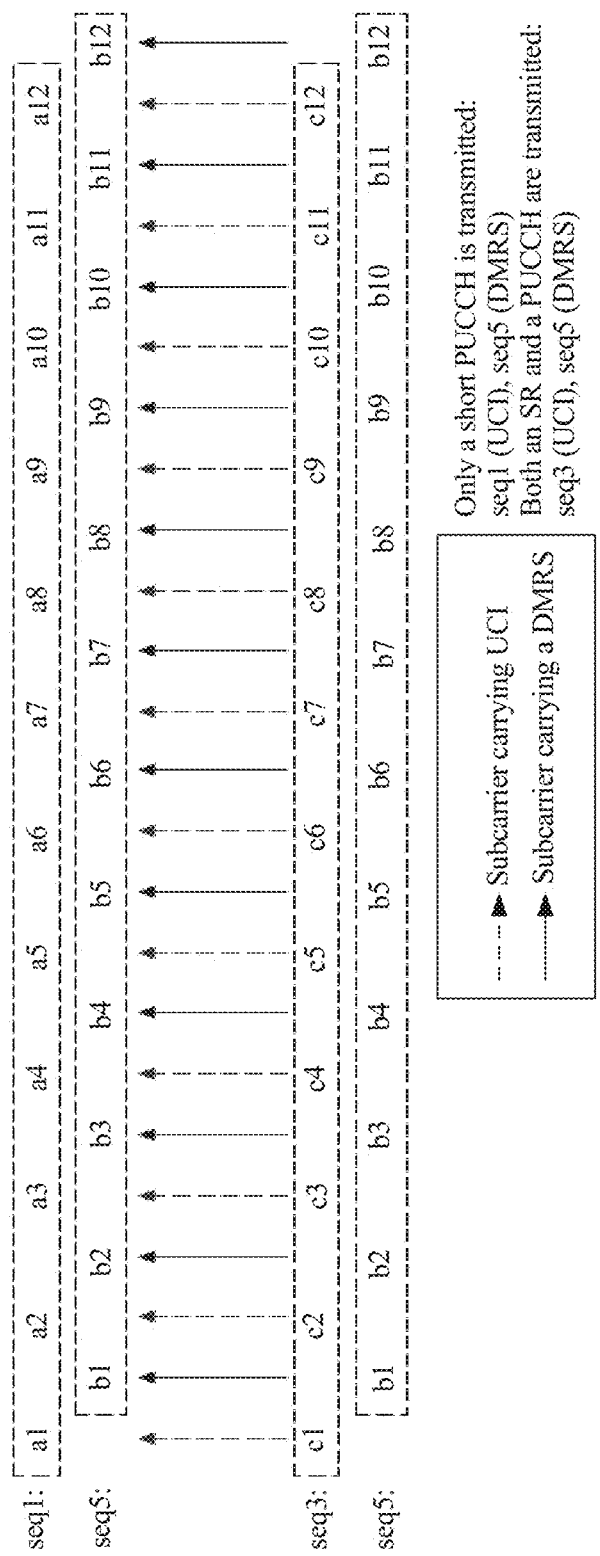
FIG. 4 is a schematic diagram of distribution of subcarriers used to carry UCI and a DMARS in two PRBs according to an embodiment of this application.

The embodiment shown in FIG. 3 shows a case of one PRB, and the foregoing embodiment is also applicable to a first-format short PUCCH that occupies a frequency domain range of N PRBs, for example, N=2, 3, or 4. In FIG. 4, N=2. There are 24 subcarriers in total in the two PRBs, 12 subcarriers are allocated to carry a UCI signal, and the other 12 subcarriers are allocated to carry a DMRS signal. In this case, the base station instructs the UE to carry the UCI by using the seq3 and carry the DMRS by using the seq5 when transmitting the first-format short PUCCH and indicating the SR. Therefore, when the UE transmits only the first-format short PUCCH, the UCI signal is carried by using the seq1 on the subcarriers occupied by the UCI, and the DMRS signal is carried by using the seq5 on the subcarriers occupied by the DMRS. When the UE transmits the first-format short PUCCH and indicates the SR, the UE carries the UCI signal by using the seq3 on the subcarriers occupied by the UCI, and carries the DMRS signal by using the seq5 on the subcarriers occupied by the DMRS. Optionally, sequences shown in FIG. 4 are Zad-off Chu sequences.

On the base station side, after receiving the first-format short PUCCH, the base station performs DFT multiplies, by the corresponding sequence, the corresponding subcarriers carrying the DMRS to obtain channel estimation, and multiplies, by the sequence, the corresponding subcarriers carrying the UCI, to detect whether an SR is transmitted.

2. A first-format short PUCCH transmitted in a code division manner carries an SR.

The code division means that in a PRB in Which the first-format short PUCCH is located, some sequence combinations are used to carry the first-format short PUCCH. For example, 2-bit information corresponds to four possible cases, and four sequences are allocated for the cases. Then, when the first-format short PUCCH is transmitted, none of the UCI and the DMRS is transmitted, and only a particular sequence is used to carry specific information. An implementation in which the first-format short PUCCH transmitted in the code division manner carries the SR is described by using two cases in which an SR resource is reserved and no SR resource is reserved.

a. An SR resource is reserved in a slot.

When the base station exchanges signaling with the UE, the base station allocates a time-frequency resource to the UE. The resource may be periodically sent, that is, the base station allocates the resource at an interval of a fixed time period. The resource is the SR resource herein. When the UE needs to transmit an SR, the UE transmits the SR on the SR resource in each period. Optionally, the SR may be transmitted with reference to a transmission format of the first-format PUCCH, that is, in the code division manner.

The SR resource is reserved in the slot. In one time domain symbol, when the UE needs to transmit both the first-format short PUCCH and the SR, the UE transmits the first-format short PUCCH on the SR resource; when the UE needs to transmit only the first-format short PUCCH, the UE transmits the first-format short PUCCH on a resource that is allocated by the base station for transmitting the first-format short PUCCH, and in this case, the resource that is allocated by the base station for transmitting the first-format physical uplink control signaling is different from the SR resource. Optionally, the base station indicates that the SR resource and the resource of the first-format short PUCCH are located at different frequency domain locations. When the UE needs to transmit only the SR or needs to transmit both the SR and the first-format short PUCCH, the UE performs transmission on the SR resource. When the UE needs to transmit only the first-format short PUCCH, but does not need to transmit the SR, the UE performs transmission on the resource of the first-format short PUCCH.

b. No SR resource is reserved in a slot.

When no SR resource is reserved in the slot, and the UE needs to transmit the first-format short PUCCH, the UE selects, based on whether an SR needs to be transmitted, a subcarrier group for transmission on a resource used to transmit the first-format short PUCCH.

In a possible implementation, the UE transmits physical uplink control signaling and indicates an SR by using a first subcarrier group on a resource used to transmit the short physical uplink control signaling, where the first subcarrier group is used to transmit the physical uplink control signaling and indicate the SR.

A subcarrier location of the first subcarrier group is different from a subcarrier location of a second subcarrier group, and the second subcarrier group is used to transmit the short physical uplink control signaling.

Before the UE transmits the physical uplink control signaling and indicates the SR by using the first subcarrier group on the resource used to transmit the physical uplink control signaling, the method further includes:

receiving, by the UE, third signaling sent by the base station, and receiving fourth signaling sent by the base station.

The third signaling includes the first subcarrier group that is configured by the base station and that is used to transmit the physical uplink control signaling and indicate the SR.

The fourth signaling includes the second subcarrier group that is configured by the base station and that is used to transmit the physical uplink control signaling.

For example, the base station indicates a subcarrier group that is used by the UE to transmit the SR. A subcarrier group 1 carries the physical uplink control signaling when no SR needs to be transmitted, a subcarrier group 2 is used to carry the physical uplink control signaling when the SR needs to be transmitted. To be specific, when no SR is transmitted, the UE transmits the physical uplink control signaling by using the subcarrier group 1 on the resource used to transmit the physical uplink control signaling, or when the SR is transmitted, the UE transmits the short physical uplink control signaling and indicates the SR by using the subcarrier group 2 on the resource used to transmit the physical uplink control signaling.

The physical uplink control signaling is the first-format short PUCCH.

The following describes a case in which a first-format short PUCCH transmitted in a code division manner by using one or more PRBs carries an SR.

Figure 5:
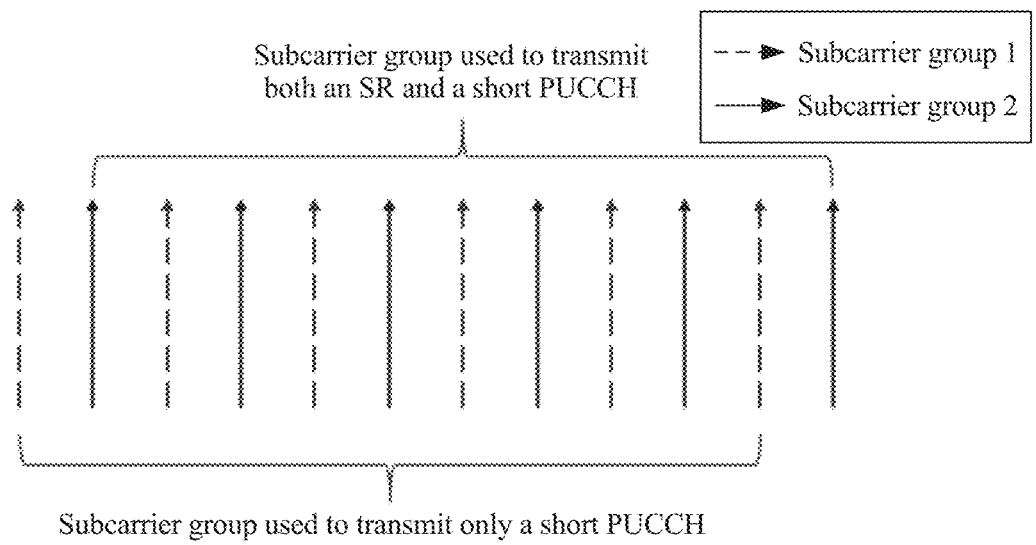
FIG. 5 is a schematic diagram of subframe occupation when different information is transmitted on two subcarrier groups in one PRB according to an embodiment of this application.

One PRB includes 12 subcarriers, six subcarriers are grouped as a subcarrier group 1, and the other six subcarriers are grouped as a subcarrier group 2. Optionally, the base station indicates a subcarrier range of the subcarrier group 1 and a subcarrier range of the subcarrier group 2 to the UE, and the range includes but is not limited to one or more pieces of information such as a subcarrier at a start location, a subcarrier gap in the subcarrier group, and a quantity of subcarriers in each subcarrier group. As shown in FIG. 5, for particular UE, if only the first-format short PUCCH is transmitted, the first-format short PUCCH is carried by using the subcarrier group 1, or when both the first-format short PUCCH and the SR are transmitted, the first-format short PUCCH is carried and the SR is indicated by using the subcarrier group 2.

On the base station side, after receiving the symbol of the first-format short PUCCH, the base station detects whether there is energy on each subcarrier group, to determine whether an SR is transmitted. For example, if energy received on the subcarrier group 1 is higher than energy received on the subcarrier group 2, the base station determines that the UE transmits only the first-format short PUCCH, or if energy received on the subcarrier group 2 is higher than energy received on the subcarrier group 1, the base station determines that the UE transmits the first-format short PUCCH and indicates the SR.

Figure 6:
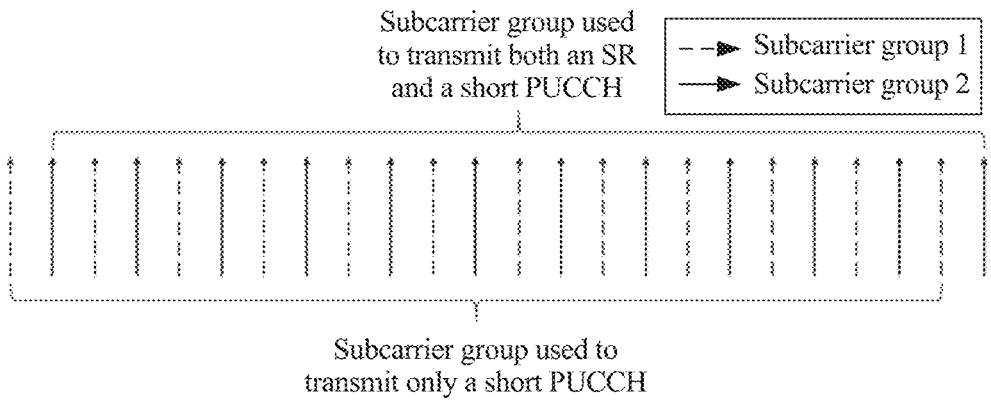
FIG. 6 is a schematic diagram of subframe occupation when different information is transmitted on two subcarrier groups in two PRBs according to an embodiment of this application.

FIG. 5 shows only a subcarrier group used to transmit the first-format short PUCCH and a subcarrier group used to transmit the first-format short PUCCH and indicate the SR when there is only one PRB. This application is also applicable to a first-format short PUCCH having a frequency domain range of N PRBs, for example, N=2, 3, or 4. FIG. 6 shows an example in which N=2. There are 24 subcarriers in total in the two PRBs, 12 subcarriers are allocated to carry a UCI and the other 12 subcarriers are allocated to carry a DMRS signal. The base station instructs particular UE to carry the first-format short PUCCH by using a subcarrier group 2 when the first-format short PUCCH is transmitted and the SR is indicated. When the UE transmits only the first-format short PUCCH, the UE transmits the first-format short PUCCH on the subcarrier group 1, or when the UE transmits the first-format short PUCCH and indicates the SR, the UE transmits the first-format short PUCCH and indicates the SR on the subcarrier group 2.

On the base station side, after receiving the symbol corresponding to the first-format short PUCCH, the base station also detects whether there is energy on each subcarrier group, to determine whether an SR is transmitted. For a specific implementation, refer to the foregoing implementation in which there is one PRB.

In an SR sending method described in Embodiment 1, two manners, namely, a frequency division manner and a code division manner, in which the UE transmits the first-format short PUCCH and carries the SR are described, and descriptions are provided for a case in which the SR resource is reserved and a case in which no SR resource is reserved.

Embodiment 2

Embodiment 2 of this application describes a case about how to carry an SR by reusing a short PUCCH of other UE. The short PUCCH herein may be the foregoing second-format short PUCCH. A resource of the second-format short PUCCH is used for transmission by only one UE, and other UE reuses a part of the resource to transmit an SR, and transmits, in one PRB or several consecutive PRBs in a subcarrier gap manner, a sequence that is of the SR and that corresponds to the UE.

Figure 7:
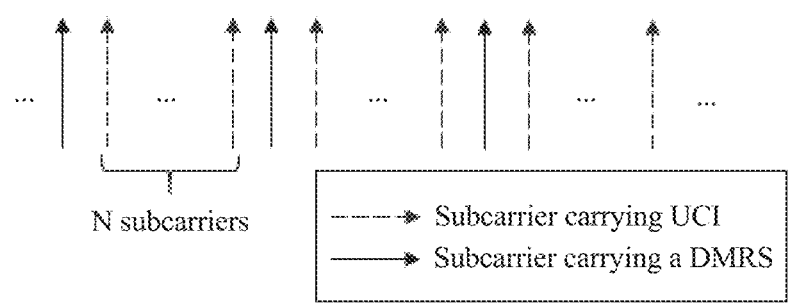
FIG. 7 is a schematic diagram of subcarriers used to carry UCI and a DMRS in a high-load short PUCCH according to an embodiment of this application.

A transmission manner of the second-format short PUCCH is shown in FIG. 7. In every N+1 consecutive subcarriers, there is one subcarrier used to carry a DMRS signal, and the other N subcarriers are used to carry a UCI signal. Optionally, N=2, 3, 4, 5, or the like. Due to a requirement of a second format, the subcarriers used to carry the UCI part are used by only one UE, and cannot be reused by other UCI. Therefore, the subcarrier used to carry the DMRS part is also used by the UE and the other UCI cannot transmit short PUCCH signaling on the subcarriers used by the UE to carry the UCI part or the subcarrier used to carry the DMRS part. Because there is more than one subcarrier used to carry the DMRS in this case, there is an extra code division resource provided for other UE for use. In Embodiment 2 of this application, the code division resource in the subcarrier part used to carry the DMRS is reused by the other UE to transmit an SR.

A frequency domain resource in which the second-format short PUCCH is located may be fixed, or may not be fixed. When the frequency domain resource is fixed, a base station broadcasts a location of a resource occupied by the second-format short PUCCH to a group of UEs. When the frequency domain resource is not fixed, the base station dynamically indicates a location of a resource occupied by the second-format short PUCCH to a group of UEs. The base station preconfigures or indicates, in a manner such as sending a group-common PDCCH, a code domain resource sequence used by each UE in a group of UEs to transmit an SR and a frequency domain resource used by the group of UEs to transmit the SR. The base station instructs the UE of the second-format short PUCCH to carry the DMRS part by using a sequence 1 when a relatively high-load short PUCCH is returned on a time-frequency resource. The sequence 1 is different from the code domain resource sequence allocated by the base station to each UE in the group of UEs.

In this way, in a possible implementation, when transmitting the SR, the UE transmits the SR by using a first sequence on a subcarrier group that includes subcarriers having a preset gap, where the preset gap includes X subcarriers, and X is a positive integer greater than or equal to 2.

The first sequence herein is different from a sequence that is used by the other UE in the UE group of the UE to transmit an SR on the subcarriers.

The subcarrier group includes a subcarrier occupied for transmitting a reference signal DMRS of short physical uplink control signaling.

Before the UE transmits the SR by using the first sequence on the subcarrier group that includes the subcarriers having the preset gap, the method further includes:

receiving, by the UE, signaling sent by the base station.

The signaling includes a frequency domain resource and the first sequence that are used by the UE to transmit the SR, and the frequency domain resource includes the subcarrier group.

The physical uplink control signaling may be the second-format short PUCCH.

On a base station side, the base station configures a resource that is used by a group of UEs to transmit an SR. The resource includes a first sequence that is used by each UE in the group of UEs to transmit an SR and a frequency domain resource that is used by the group of UEs to transmit the SR. The base station configures that UE transmits a second-format short PUCCH, and the UE transmits a DMRS by using a second sequence.

The second sequence is different from the sequence that is used by each UE to transmit the SR. A frequency domain resource used by the UE to transmit the DMRS is the same as the frequency domain resource used by the group of UEs to transmit the SR.

When receiving the second-format short PUCCH, the base station performs DFT, and multiples, by the corresponding sequence, the corresponding subcarriers carrying the DMRS, to determine whether an SR is transmitted.

The following describes a case in which an SR is transmitted in one PRB by reusing a resource of a second-format short PUCCH of other UE.

It is first noted herein that the second solution involves two types of UEs. A first type of UE is UE that transmits only a second-format short PUCCH, and the other type of UE is UE that transmits an SR by reusing subcarriers that are used by the first type of UE to transmit a DMRS. The second type of UE may be a group of UEs, and the group of UEs transmits only an SR. The second type of UE does not know that the other UE transmits a second-format short PUCCH, but the base station instructs the UE to transmit the SR by using a first sequence on a subcarrier group that includes subcarriers having a preset gap.

Figure 8:
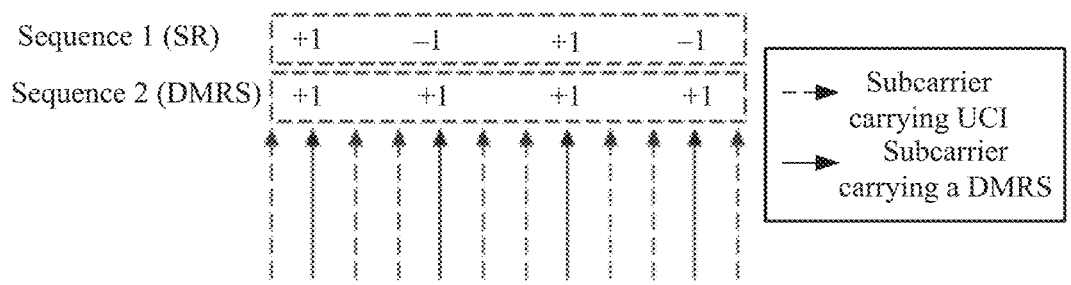
FIG. 8 is a schematic diagram of reusing subcarriers used to carry a DMRS in a high-load short PUCCH in one PRB according to an embodiment of this application.

As shown in FIG. 8, one PRB includes 12 subcarriers, four subcarriers are used to carry a DMRS signal, and the other eight subcarriers are used to carry a UCI signal. The base station indicates a group of sequences used by each UE in a group of UEs to transmit an SR, and the group of sequences is different from a sequence that is used to carry a DMRS on a second-format short PUCCH. Optionally, the base station instructs UE transmitting a second-format short PUCCH to carry a DMRS signal by using a sequence {+1, +1, +1, +1}. The base station instructs UE1 to transmit an SR by using {+1, −1, +1, −1} on subcarriers occupied by the DMRS of the second-format short PUCCH, that is, the UE1 transmits the SR by using the sequence {+1, −1, +1, −1} on the subcarriers indicated by the base station. Similarly, the base station instructs UE2 in the group of UEs to transmit an SR by using {+1, +1, −1, −1} on the subcarriers occupied by the DMRS, and the base station instructs UE3 to transmit an SR by using {+1, −1, −1, +1} on the subcarriers occupied by the DMRS.

The following describes a case in which when a second-format short PUCCH occupies a plurality of PRBs, an SR is transmitted by reusing a resource of a second-format short PUCCH of other UE.

Figure 9:
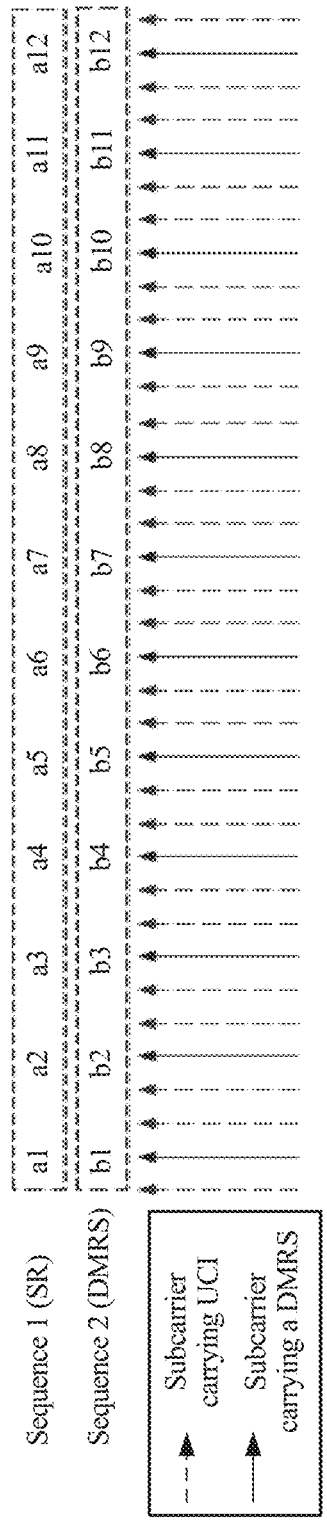
FIG. 9 is a schematic diagram of reusing subcarriers used to carry a DMRS in a high-load short PUCCH in three PRBs according to an embodiment of this application.

FIG. 9 shows 36 subcarriers in three PRBs, 12 subcarriers carry a DMRS signal, and the other 24 subcarriers carry a UCI signal. The base station indicates a group of sequences used by each UE in a group of UEs to transmit an SR, and the group of sequences is different from a sequence that is used to carry a DMRS on a second-format short PUCCH. Optionally, the base station instructs UE transmitting a second-format short PUCCH to carry a DMRS signal by using a sequence 2. The base station instructs UE1 to transmit an SR by using a sequence 1 on a subcarrier group occupied by the DMRS of the second-format short PUCCH, that is, the UE1 transmits the sequence 1 on the subcarrier group to indicate the SR. Optionally, the DMRS signal on the second-format short PUCCH is carried by using a Zad-off Chu sequence. Optionally, each sequence that is used by each UE to transmit an SR and that is shown in FIG. 9 is a Zad-off Chu sequence.

On the base station side, when receiving a symbol corresponding to a short PUCCH, the base station performs DFT, and multiplies, by a corresponding sequence, corresponding subcarriers used to carry a DMRS, to determine whether an SR is transmitted.

Embodiment 3

Embodiment 1 and Embodiment 2 describe how to carry an SR in frequency domain when a resource of a short PUCCH occupies a single symbol. Embodiment 3 describes a problem about how a short PUCCH occupying two symbols carries an SR. The symbol may be understood as a time domain symbol.

When two symbols in a slot are used to transmit physical uplink control signaling, and the two symbols include a first symbol and a second symbol, the following separately describes a case in which an SR resource is reserved in at least one symbol and a case in which no SR resource is reserved in either of the two symbols.

1. An SR resource is reserved in at least one symbol.

a. An SR resource is reserved in one of the two symbols, and no SR resource is reserved in the other symbol.

A base station allocates a periodic time-frequency resource to UE for transmitting an SR. The resource includes but is not limited to information such as a slot location, a time domain symbol location, and a code domain resource. When the UE transmits a short PUCCH that occupies two symbols, there is an SR resource in one or two time domain symbols in the two symbols, and the UE transmits the short PUCCH on the SR resource. For a time domain symbol in which there is no SR resource, the UE transmits the short PUCCH on a resource allocated by the base station. Optionally, for a short PUCCH that occupies two symbols and that has frequency hopping, the UE may transmit the short PUCCH and indicate the SR on the SR resource in one symbol, and transmit the short PUCCH in the other symbol in a frequency hopping manner, to meet a frequency hopping requirement. Optionally, to avoid interference when an existing system and an original system coexist, the second-to-last symbol in a slot/subframe is configured for the UE for transmitting the SR.

To be specific, two symbols in a slot are used to transmit physical uplink control signaling, the two symbols include a first symbol and a second symbol, and a first SR resource is configured in the first symbol. The UE transmits the physical uplink control signaling and indicates an SR on the first SR resource in the first symbol, and transmits the physical uplink control signaling on a first resource in the second symbol. Frequency domain resources or code domain resources in the first resource and a second SR resource are different.

Before the UE transmits long physical uplink control signaling and indicates an SR, the method further includes:

receiving, by the UE, second signaling sent by the base station, where the second signaling is used to instruct to transmit the physical uplink control signaling and indicate the SR on the first SR resource in the first symbol, and instruct to transmit the physical uplink control signaling on the first resource in the second symbol, the first SR resource is configured in the first symbol, and no second SR resource is reserved in the second symbol; or the first SR resource is configured in the first symbol, and the second SR resource is configured in the second symbol.

When the first SR resource is configured in the first symbol and the second SR resource is configured in the second symbol, a frequency domain resource in the first SR resource in the first symbol is the same as or different from a frequency domain resource in the second SR resource in the second symbol.

b. An SR resource is reserved in each of the two symbols.

A base station allocates two or more time-frequency resources to UE for transmitting an SR. For example, the base station allocates two time-frequency resources to the UE for transmitting the SR. When transmitting the SR, the UE may transmit the SR by occupying the SR resource in one symbol, or may transmit the SR by occupying the SR resources in the two symbols.

When the SR is transmitted by occupying the SR resources in the two symbols, a first resource request SR resource is configured in a first symbol, there is a second SR resource in a second symbol, and the user equipment UE transmits the SR by using the first SR resource in the first symbol and the second SR resource in the second symbol; or when a first SR resource is configured in a first symbol, and there is a second SR resource in a second symbol, the user equipment UE transmits physical uplink control signaling and indicates the SR by using the first SR resource in the first symbol and the second SR resource in the second symbol.

Before the UE transmits short physical uplink control signaling and indicates an SR, the method further includes:

receiving, by the UE, first signaling sent by the base station, where the first signaling is used to instruct the UE to transmit the physical uplink control signaling and indicate the SR on the first SR resource in the first symbol and the second SR resource in the second symbol, and a frequency domain resource in the first SR resource in the first symbol is the same as or different from a frequency domain resource in the second SR resource in the second symbol.

When the SR is transmitted on the SR resource in the first symbol in the two symbols, the UE transmits the short physical uplink control signaling and indicates the SR on the SR resource reserved in the first symbol, and transmits the physical uplink control signaling on a first resource in the second symbol. Frequency domain resources or code domain resources in the first resource and the second SR resource are different.

When the SR resource is reserved in each of the first symbol and the second symbol, the frequency domain resource in the SR resource reserved in the first symbol is the same as or different from the frequency domain resource in the SR resource reserved in the second symbol.

The first resource includes a resource configured by the base station, or a frequency domain gap between the first resource and the SR resource in the first symbol is a first frequency domain gap, the first frequency domain gap is the same as a second frequency domain gap, and the second frequency domain gap is a frequency domain gap between a frequency domain resource in the second symbol and a frequency domain resource in the first symbol in frequency domain resources that are indicated by the base station and that are used to transmit the short physical uplink control signaling.

Optionally, when an SR resource is reserved, and a resource of physical uplink control signaling is greater than a resource allocated for an SR, a part of a PRB of the physical uplink control signaling is located in the SR resource, or a PRB that is at a lowest location, a highest location, or a middle location in frequency domain is located in the SR resource.

Optionally, the physical uplink control signaling in the foregoing case a and case b is a short PUCCH.

Optionally, information about an SR is carried by using a symbol at the earlier time domain location in the two symbols occupied by the short PUCCH, to implement fast feedback.

There is another possible case: When an SR resource is reserved, but no physical uplink control signaling is transmitted, the base station further configures, for the UE, a frequency domain resource in at least one symbol in the two symbols to the SR resource. The UE transmits the SR on the configured SR resource, and the UE transmits the SR on the first SR resource in the first symbol and the second SR resource in the second symbol.

In this case, before the UE transmits the SR, the method further includes:

receiving, by the UE, third signaling sent by the base station, where the third signaling is used to indicate the first SR resource in the first symbol.

If the third signaling is used to indicate the first SR resource in the first symbol, the third signaling is further used to instruct the UE to obtain the second SR resource in the second symbol based on the first SR resource in the first symbol according to a preset method.

The following separately describes, by way of example, a case in which an SR resource is reserved and a short PUCCH that occupies two symbols and that has no frequency hopping carries an SR for transmission and a case in which an SR resource is reserved and a short PUCCH that occupies two symbols and that has frequency hopping carries an SR for transmission.

Figure 10:
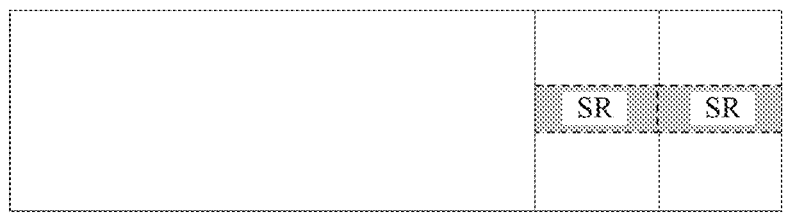
FIG. 10 is a schematic diagram of frequency domain resource configuration of an SR occupying two symbols in one slot according to an embodiment of this application.

1. When an SR resource is reserved, a short PUCCH that occupies two symbols and that has no frequency hopping is transmitted, and the UE needs to transmit both an SR and the short PUCCH that occupies two symbols, the UE transmits the short PUCCH on SR resources in the two symbols. As shown in FIG. 10, there is no frequency hopping in the SR resources in the two symbols. In other words, frequency domain resources in the SR resources in the two symbols are the same. Then the short PUCCH is transmitted and the SR is indicated on the SR resources in the two symbols.

On the base station side, the base station determines, based on a received signal/received energy at a frequency domain location corresponding to each symbol, whether an SR is transmitted.

2. When an SR resource is reserved and a short PUCCH that occupies two symbols and that has frequency hopping is transmitted, in a transmission process, the short PUCCH has frequency hopping, to achieve a diversity gain. In this case, the SR resource is still a fixed frequency domain resource. For example, frequency domain resources in SR resources in the two symbols are the same. Transmission only on the SR resources cannot meet a frequency hopping transmission requirement of the short PUCCH. Therefore, a new transmission manner needs to be discussed. For example, FIG. 11(1) and FIG. 11(2) separately indicate that frequency domain resources in two SR resources in two symbols are the same, and transmission of a short PUCCH that occupies two symbols and that has frequency hopping is supported.

Figure 11:
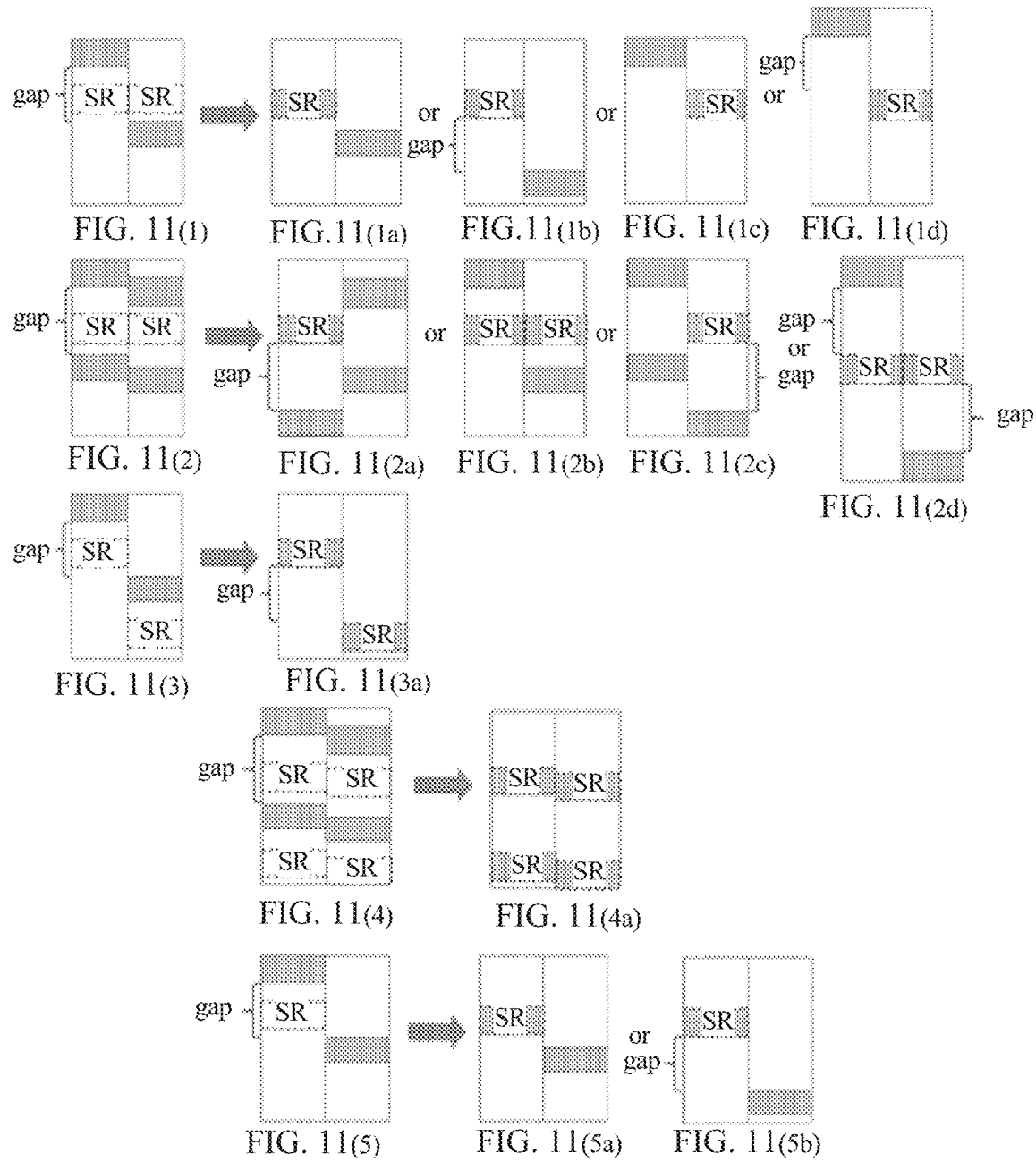
FIG. 11(1) to FIG. 11(5b) are a schematic diagram of frequency domain resources when a short PUCCH that occupies two symbols and that has frequency hopping in one slot carries an SR for transmission according to an embodiment of this application.

When there is one short PUCCH resource in each symbol, that is, only one PRB or a plurality of consecutive PRBs in each symbol is or are used to transmit a short PUCCH, as shown in FIG. 11(1), a gap (gap) between a frequency domain resource of the short PUCCH in a symbol at the later time domain location and a frequency domain resource of the short PUCCH in a symbol at the earlier time domain location is marked as a gap 1. Four possible transmission manners are listed herein, as shown in FIG. 11(1a) to FIG. 11(1d). In FIG. 11(1a), the UE transmits a first symbol of the short PUCCH on an SR resource in a symbol at the earlier time domain location, that is, the UE transmits the short PUCCH and indicates the SR on the SR resource in the symbol at the earlier time domain location; the UE transmits a second symbol of the short PUCCH in a symbol at the later time domain location, and a short PUCCH resource in the symbol at the later time domain location is configured by the base station, that is, the short PUCCH resource in the symbol at the later time domain location is indicated by the base station. In FIG. 11(1b), the UE transmits a first symbol of the short PUCCH on an SR resource in a symbol at the earlier time domain location, that is, the UE transmits the short PUCCH and indicates the SR on the SR resource in the symbol at the earlier time domain location; the UE transmits a second symbol of the short PUCCH in a symbol at the later time domain location. In this case, a gap between a frequency domain resource of the short PUCCH in the symbol at the later time domain location and a frequency domain resource of the SR in the symbol at the earlier time domain location is marked as a gap 2. An absolute value of the gap 2 is the same as an absolute value of the gap 1, that is, the gap 2 is a frequency domain gap between a frequency domain resource in the second symbol and a frequency domain resource in the first symbol in frequency domain resources that are indicated by the base station and that are used to transmit the short PUCCH. In FIG. 11(1c), the UE transmits a first symbol of the short PUCCH in a symbol at the earlier time domain location, and transmits a second symbol of the short PUCCH on an SR resource in a symbol at the later time domain location. In this case, a short PUCCH resource in the symbol at the earlier time domain location is indicated by the base station. In FIG. 11(1d), the UE transmits a first symbol of the short PUCCH in a symbol at the earlier time domain location, and transmits a second symbol of the short PUCCH on an SR resource in a symbol at the later time domain location. In this case, a gap between a frequency domain resource of the SR in the symbol at the later time domain location and a frequency domain resource of the short PUCCH in the symbol at the earlier time domain location is marked as a gap 3. An absolute value of the gap 3 is the same as an absolute value of the gap 1, that is, the gap 3 is a frequency domain gap between a frequency domain resource in the second symbol and a frequency domain resource in the first symbol in frequency domain resources that are indicated by the base station and that are used to transmit the short PUCCH.

On the base station side, the base station determines, based on a received signal/received energy at a frequency domain location of the corresponding SR resource in one or two symbols, whether an SR is transmitted.

When there are two or more short PUCCH resources in each symbol, that is, two PRBs or a plurality of single PRBs or a plurality of consecutive PRBs in each symbol are used to transmit a short PUCCH, as shown in FIG. 11(2), a gap between one short PUCCH frequency domain resource and another short PUCCH frequency domain resource in one symbol is marked as a gap 4. Four possible transmission manners are listed herein, as shown in FIG. 11(2a) to FIG. 11(2d). In FIG. 11(2a), the UE transmits a first symbol of the short PUCCH on an SR resource in a symbol at the earlier time domain location, transmits the short PUCCH on a frequency domain resource that has a gap 5 with the SR resource and that is in the symbol at the earlier time domain location, and transmits a second symbol of the short PUCCH in a symbol at the later time domain location. In this case, a short PUCCH resource in the symbol at the later time domain location is indicated by the base station. An absolute value of the gap 5 is the same as an absolute value of the gap 4. In FIG. 11(2b), the UE transmits the short PUCCH on SR resources in the two symbols, and transmits the short PUCCH on resources indicated by the base station. In FIG. 11(2c), the UE transmits the short PUCCH in a symbol at the earlier time domain location, transmits the short PUCCH on an SR resource in a symbol at the later time domain location, and transmits the short PUCCH on a frequency domain resource that has a gap 6 with the SR resource and that is in the symbol at the later time domain location. In this case, a short PUCCH resource in the symbol at the earlier time domain location is indicated by the base station. An absolute value of the gap 6 is the same as an absolute value of the gap 4. In FIG. 11(2d), the UE transmits the short PUCCH on an SR resource in a symbol at the earlier time domain location, and transmits the short PUCCH on a frequency domain resource that has a gap 7 with the SR resource and that is in the symbol at the earlier time domain location; the UE transmits the short PUCCH on an SR resource in a symbol at the later time domain location, and transmits the short PUCCH on a frequency domain resource that has a gap 8 with the SR resource and that is in the symbol at the later time domain location. An absolute value of the gap 7 is the same as an absolute value of the gap 4, and an absolute value of the gap 8 is the same as the absolute value of the gap 4.

On a receive side, the base station determines, based on a received signal/received energy at a frequency domain location of the corresponding SR resource in one or two symbols, whether an SR is transmitted.

Particularly, when the base station configures two or more SR resources, that is, frequency domain resources in SR resources in two symbols are different, as shown in FIG. 11(3), when no SR is transmitted, the UE transmits a short PUCCH on a short PUCCH resource configured by the base station. As shown in FIG. 11(3a), when an SR is transmitted, the UE transmits a short PUCCH and indicates the SR on the two or more SR resources configured by the base station. Optionally, a gap between two frequency domain resources in two or more short PUCCH frequency domain resources configured by the base station is a gap 9, a gap between two frequency domain resources in two or more SR frequency domain resources configured by the base station is a gap 10, and an absolute value of the gap 9 is equal to an absolute value of the gap 10.

On the receive side, the base station determines, based on a received signal/received energy at a frequency domain location of the corresponding SR resource in one or two symbols, whether an SR is transmitted.

In still another possible case, two or more SR resources may be configured in each of the two symbols. For example, frequency domain resources in two SR resources in each symbol are different, as shown in FIG. 11(4). When the UE does not transmit an SR, the UE transmits a short PUCCH on short PUCCH resources configured by the base station in two symbols; when the UE transmits an SR, the UE transmits a short PUCCH and indicates the SR on the two or more SR resources that are configured by the base station in each symbol, as shown in FIG. 11(4a).

On the receive side, the base station determines, based on a received signal/received energy at a frequency domain location of the corresponding SR resource in one or two symbols, whether an SR is transmitted.

In yet another possible case, the base station may configure one SR resource in a first symbol, and configures no SR resource in a second symbol, as shown in FIG. 11(5). When the UE does not transmit an SR, the UE transmits a short PUCCH on short PUCCH resources that are configured by the base station in two symbols; when the UE transmits an SR, as shown in FIG. 11(5a), the UE transmits a short PUCCH and indicates the SR on the SR resource that is configured by the base station in the first symbol, and transmits the short PUCCH on a short PUCCH resource that is configured by the base station in the second symbol. As shown in FIG. 11(5b), when the UE transmits an SR, the UE transmits a short PUCCH and indicates the SR on the SR resource that is configured by the base station in the first symbol, and transmits the short PUCCH on a short PUCCH resource that is configured by the base station in the second symbol. An absolute value of a frequency domain gap between the short PUCCH resource that is configured by the base station in the second symbol and the SR resource in the first symbol is the same as an absolute value of a frequency domain gap between the short PUCCH resources configured by the base station in the second symbol and the first symbol.

On the receive side, the base station determines, based on a received signal/received energy at a frequency domain location of the corresponding SR resource in one or two symbols, whether an SR is transmitted.

FIG. 12(1) to FIG. 12(4a) shows a case in which the UE transmits an SR but does not transmit a short PUCCH in two symbols. In a first possible case, as shown in FIG. 12(1), an SR resource allocated by the base station is located in the second-to-last symbol in a slot. When the UE transmits an SR, the UE transmits the SR on the SR resource in the second-to-last symbol, as shown in FIG. 12(1a). In a second possible case, an SR resource allocated by the base station is located in the last symbol in the two symbols, as shown in FIG. 12(2). When the UE transmits an SR, the UE transmits the SR on the SR resource in the last symbol, as shown in FIG. 12(2a). In a third possible case, SR resources allocated by the base station are located at a same frequency domain location in the two symbols, as shown in FIG. 12(3). When the UE transmits an SR, the UE transmits the SR on the SR resources in the two symbols, as shown in FIG. 12(3a). In a fourth possible case, SR resources allocated by the base station are located at different frequency domain locations in the two symbols, as shown in FIG. 12(4). When the UE transmits an SR, the UE transmits the SR on the respective SR resources in the two symbols, as shown in FIG. 12(4a).

On the base station side, the base station determines, based on a received signal/received energy at a frequency domain location of the corresponding SR resource in one or two symbols, whether an SR is transmitted.

2. No SR resource is reserved in either of the two symbols.

In a possible implementation, for a short PUCCH having no frequency hopping, an SR transmission manner used when no SR is reserved in one symbol in Embodiment 1 or Embodiment 2 is used for two consecutive symbols in a slot.

In another possible implementation, for a short PUCCH having frequency hopping, when the UE transmits an SR, two symbols in a slot are used to transmit the short PUCCH, and the two symbols include a first symbol and a second symbol. The UE transmits the short PUCCH and carries or indicates the SR on a first resource in the first symbol and a second resource in the second symbol. A range of a frequency domain resource in the first resource is the same as a range of a frequency domain resource that is used to transmit the short PUCCH in the second symbol, and a range of a frequency domain resource in the second resource is the same as a range of a frequency domain resource that is used to transmit the short PUCCH in the first symbol.

In other words, the base station transmits the short PUCCH on an allocated frequency domain resource 1 in the first symbol and an allocated frequency domain resource 2 in the second symbol. In this case, if the UE transmits the short PUCCH and indicates the SR, the UE transmits the short PUCCH and carries or indicates the SR on a frequency domain resource 2 in the first symbol and a frequency domain resource 1 in the second symbol.

Before the UE transmits short physical uplink control signaling and indicates an SR, the method further includes:

receiving, by the UE, signaling sent by the base station, where the signaling is used to indicate the first resource in the first symbol and the second resource in the second symbol that are used by the UE to transmit the physical uplink control signaling and indicate the SR.

The short physical uplink control signaling is the short PUCCH in the foregoing description.

On the base station side, the base station determines, based on a received signal/received energy in the two symbols, whether an SR is transmitted.

Embodiment 4

In one slot, there may be a first-format SR resource and a second-format SR resource, or a long PUCCH resource and a short PUCCH resource. Relative to the short PUCCH resource/the first-format SR resource, the long PUCCH/the second-format SR resource covers a wider symbol range, and covers 4 to 14 symbols. In terms of a function, a long PUCCH is, for example, information such as an ACK/NACK, and a coverage range is greater than that of a short PUCCH.

A base station configures an SR resource in the following two manners. In a first manner, the base station separately configures a long SR resource and a short SR resource for UE. In a second manner, the base station configures an SR resource with a particular period for UE, and does not specify the SR resource as a long SR resource or a short SR resource. For the two configuration manners, in one slot, particular UE possibly may have both a long SR resource and a short SR resource, as shown in FIG. 13. In this case, if same information is transmitted on both the long SR resource and the short SR resource, an energy waste may be caused.

The following provides descriptions for different cases.

1. When the base station configures both the first-format SR resource and the second-format SR resource in one slot for the UE, if the UE transmits only an SR but does not transmit a PUCCH, the UE transmits the SR on a particular resource in the second-format SR resource and the first-format SR resource. Optionally, the base station instructs the UE to use the second-format SR resource or the first-format SR resource when only the SR is transmitted, or the base station instructs the UE to transmit the SR on the second-format SR resource or the first-format SR resource by default when both the two types of resources are configured.

2. The base station configures both the first-format SR resource and the second-format SR resource in one slot for the UE. If the UE transmits a long PUCCH and carries or indicates an SR in a symbol in which the second-format SR resource is located, and the long PUCCH can carry the SR, the UE transmits the long PUCCH and carries or indicates the SR on a resource of the second-format SR resource. If the UE transmits the long PUCCH and carries or indicates the SR, and the long PUCCH cannot carry the SR, the UE transmits the SR on the first-format SR resource.

In this case, before the UE transmits the SR, the UE receives first signaling sent by the base station, where the first signaling includes the second-format SR resource and the first-format SR resource, and a quantity of symbols occupied by the second-format SR resource is greater than a quantity of symbols occupied by the first-format SR resource.

The UE further receives second signaling sent by the base station, and if the second signaling is used to indicate to the UE that no PUCCH is transmitted on the second-format SR resource, or if the second signaling is used to indicate to the UE that a PUCCH is transmitted on the second-format SR resource and the PUCCH can carry the SR, the UE transmits the SR on the second-format SR resource; or if the second signaling is used to indicate to the UE that a PUCCH is transmitted on the second-format SR resource and the PUCCH cannot carry or indicate the SR, the UE transmits the SR on the first-format SR resource.

3. There is the first-format SR resource in the slot. If the UE further transmits a short PUCCH, and the short PUCCH can carry an SR, the UE transmits the short PUCCH and carries or indicates the SR on a short PUCCH resource.

Before the UE transmits the SR, the method further includes:

receiving, by the UE, first signaling sent by the base station, where the first signaling includes the first-format SR resource, and a symbol occupied by the first-format SR resource is the same as or partially the same as a symbol occupied by the short PUCCH resource; and receiving, by the UE, second signaling sent by the base station, where if the second signaling is used to indicate that the short PUCCH can carry or indicate the SR, the UE transmits the short PUCCH and carries or indicates the SR on the short PUCCH resource.

4. If there are the long PUCCH resource and the short PUCCH resource in the slot, the UE determines, based on whether a long PUCCH and a short PUCCH can carry an SR, to transmit the SR on the long PUCCH resource or the short PUCCH resource.

a. The UE transmits the short PUCCH and the long PUCCH in the slot, that is, both the short PUCCH resource and the long PUCCH resource are allocated in the slot. If the long PUCCH can carry the SR, and the short PUCCH cannot carry the SR, the UE transmits the long PUCCH and carries or indicates the SR on the long PUCCH resource.

b. The UE transmits the short PUCCH and the long PUCCH in the slot, that is, both the short PUCCH resource and the long PUCCH resource are allocated in the slot. If the long PUCCH can carry an SR, and the short PUCCH can carry the SR, the UE transmits the long PUCCH and carries or indicates the SR on the long PUCCH resource, or the UE transmits the short PUCCH and carries or indicates the SR on the short PUCCH resource, or the UE transmits the long PUCCH and carries or indicates the SR on the long PUCCH resource according to an indication of the base station, or the UE transmits the short PUCCH and carries or indicates the SR on the short PUCCH resource according to an indication of the base station.

c. The UE transmits the short PUCCH and the long PUCCH in the slot, that is, both the short PUCCH resource and the long PUCCH resource are allocated in the slot. If the long PUCCH cannot carry the SR, and the short PUCCH can carry the SR, the UE transmits the short PUCCH and carries or indicates the SR on the short PUCCH resource.

In case 4, before the UE determines that the SR needs to be transmitted, the method further includes: receiving, by the UE, signaling sent by the base station, where if the signaling is used to indicate to the UE that there are the long PUCCH resource and the short PUCCH resource in the slot, the UE determines, based on whether the long PUCCH and the short PUCCH can carry the SR, to transmit the SR on the long PUCCH resource or the short PUCCH resource.

5. The first-format SR resource is configured in the slot, and the UE transmits a long PUCCH in the slot, that is, the long PUCCH resource is configured in the slot. If the long PUCCH cannot carry an SR, the UE transmits the SR on the first-format SR resource. If the long PUCCH can carry the SR, the UE transmits the long PUCCH and carries or indicates the SR on the long PUCCH resource, or the UE transmits the SR on the first-format SR resource, or the base station indicates a resource used to transmit the SR.

6. The second-format SR resource is configured in the slot, and the UE transmits a short PUCCH in the slot, that is, the short PUCCH resource is further configured in the slot. If the short PUCCH cannot carry an SR, the UE transmits the SR on the second-format SR resource. If the short PUCCH can carry the SR, the UE transmits the short PUCCH and carries or indicates the SR on the short PUCCH resource, or the UE transmits the SR on the second-format SR resource, or the base station indicates a resource used to transmit the SR.

7. The second-format SR resource is configured in the slot, and the UE transmits a long PUCCH in the slot, that is, the long PUCCH resource is further configured in the slot. If the long PUCCH cannot carry an SR, the UE determines not to transmit the SR or determines to transmit the SR on the second-format SR resource. If the long PUCCH can carry the SR, the UE transmits the long PUCCH and carries or indicates the SR on the long PUCCH resource.

8. The second-format SR resource is configured in the slot, and the UE transmits a short PUCCH and a long PUCCH in the slot, that is, the long PUCCH resource and the short PUCCH resource are further configured in the slot. If the long PUCCH can carry an SR, and the short PUCCH can carry the SR, the UE transmits the long PUCCH and carries or indicates the SR on the long PUCCH resource, or the UE transmits the short PUCCH and carries or indicates the SR on the short PUCCH resource, or the UE transmits the long PUCCH and carries or indicates the SR on the long PUCCH resource according to an indication of the base station, or the UE transmits the short PUCCH and carries or indicates the SR on the short PUCCH resource according to an indication of the base station. If the long PUCCH cannot carry the SR, and the short PUCCH can carry the SR, the UE transmits the short PUCCH and carries or indicates the SR on the short PUCCH resource. If the long PUCCH cannot carry the SR, and the short PUCCH can carry the SR, the UE transmits the short PUCCH and carries or indicates the SR on the short PUCCH resource. If the long PUCCH cannot carry the SR, and the short PUCCH cannot carry the SR, the UE transmits the SR on the second-format SR resource.

9. Both the second-format SR resource and the first-format SR resource are configured in the slot, and the UE transmits a short PUCCH in the slot, that is, the short PUCCH resource is further configured in the slot. If the short PUCCH cannot carry an SR, the UE transmits the SR on the second-format SR resource or the first-format SR resource. If the short PUCCH can carry the SR, the UE transmits the SR on the second-format SR resource or the first-format SR resource, or transmits the short PUCCH and carries or indicates the SR on the short PUCCH resource.

10. Both the second-format SR resource and the first-format SR resource are configured in the slot, and the UE transmits a short PUCCH and a long PUCCH in the slot, that is, the long PUCCH resource and the short PUCCH resource are further configured in the slot. If the long PUCCH can carry an SR, and the short PUCCH can carry the SR, the UE transmits the long PUCCH and carries or indicates the SR on the long PUCCH resource, or the UE transmits the short PUCCH and carries or indicates the SR on the short PUCCH resource, or the UE transmits the long PUCCH and carries or indicates the SR on the long PUCCH resource according to an indication of the base station, or the UE transmits the short PUCCH and carries or indicates the SR on the short PUCCH resource according to an indication of the base station. If the long PUCCH cannot carry the SR, and the short PUCCH can carry the SR, the UE transmits the short PUCCH and carries or indicates the SR on the short PUCCH resource. If the long PUCCH cannot carry the SR, and the short PUCCH cannot carry the SR, the UE transmits the SR on the second-format SR resource or the first-format SR resource, or the base station indicates a resource used to transmit the SR.

In still another possible implementation, in one slot, if the second-format SR resource is configured for the UE, the UE transmits an SR on the second-format SR resource. Alternatively, if the long PUCCH resource is configured for the UE, and a long PUCCH can carry an SR, the UE transmits the long PUCCH and carries or indicates the SR on the long PUCCH resource.

Optionally, if the long PUCCH in the slot cannot carry the SR, the SR is not transmitted on the second-format SR resource. Further, the UE does not have the long PUCCH, and the UE has the first-format SR resource or a short PUCCH can carry an SR. The UE transmits the SR on the first-format SR resource or transmits the short PUCCH and carries or indicates the SR on the short PUCCH resource.

In still another possible implementation, a long PUCCH can carry an SR, and the UE transmits the long PUCCH and carries or indicates the SR on the long PUCCH resource. If the base station does not configure the second-format SR resource or the long PUCCH that can carry the SR, and a short PUCCH of the UE can carry the SR, the UE transmits the short PUCCH and carries or indicates the SR on the short PUCCH resource.

The foregoing mainly describes, from the perspective of interaction between network elements, the solutions provided in the embodiments of this application. It may be understood that to implement the foregoing functions, the network elements, for example, the base station and the user equipment UE, each include a corresponding hardware structure and/or software module performing the functions. A person skilled in the art should easily be aware that, units and algorithms steps in the examples described with reference to the embodiments disclosed in this specification may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the base station and the user equipment UE may be divided based on the foregoing method example. For example, each functional module may be divided according to each function, or two or more functions may be integrated into one processing module. The integrated module may be implemented in a form of hardware, or may be implemented in a form of a software functional module. It should be noted that module division in the embodiments of this application is an example and is merely logical function division. During actual implementation, there may be another division manner.

When the functional modules are divided by using the corresponding functions, FIG. 14 is a possible schematic structural diagram of user equipment in the foregoing embodiments. User equipment 140 includes a transceiver unit 1401, a processing unit 1402, and a storage unit 1403. The transceiver unit 1401 is configured to: transmit physical uplink control signaling, or transmit an SR, or transmit physical uplink control signaling and carry or indicate an SR, and is configured to exchange signaling with a base station, and the like. For details, refer to the foregoing method embodiments. The processing unit 1402 is configured to determine, based on received signaling, how to transmit the SR. For details, refer to the method description in the foregoing embodiments. The storage unit 1403 is configured to store data of the user equipment and a program used to perform the method. All related content of the foregoing method embodiments may be cited in function descriptions of a corresponding functional module. Details are not described herein again.

Figure 15:
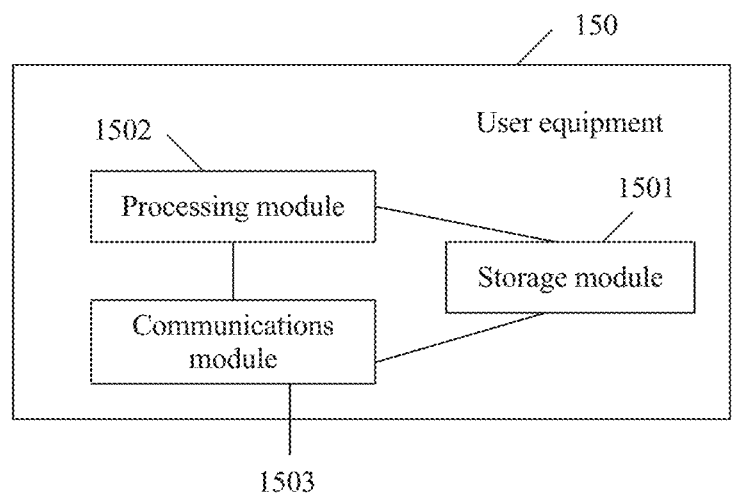
FIG. 15 is a schematic structural diagram of user equipment according to an embodiment of this application.

When an integrated unit is used, FIG. 15 is a possible schematic structural diagram of user equipment in the foregoing embodiments. User equipment 150 includes a processing module 1502 and a communications module 1503. The processing module 1302 is configured to control and manage actions of the user equipment. For example, the processing module 1502 is configured to support the user equipment in determining, based on received signaling, how to transmit an SR. For details, refer to the method description in the foregoing embodiments. The communications module 1503 is configured to support communication between the user equipment and another network entity, for example, communication between the user equipment and a functional module of a base station or a network entity. The user equipment may further include a storage module 1501, configured to store program code and data of the user equipment.

The processing module 1502 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field-programmable gate array (Field-Programmable Gate Array, FPGA), or another programmable logical device, a transistor logical device, a hardware component, or any combination thereof. The controller/processor may implement or execute various example logical blocks, modules, and circuits described with reference to content disclosed in this application. Alternatively, the processor may be a combination implementing a computing function, for example, a combination of one or more microprocessors, or a combination of the DSP and a microprocessor. The communications module 1503 may be a transceiver, a transceiver circuit, a communications interface, or the like. The storage module 1501 may be a memory.

Figure 16:
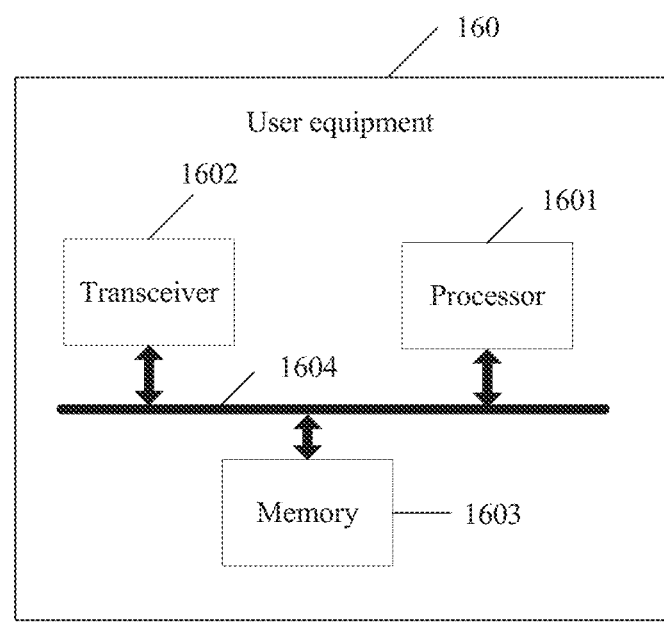
FIG. 16 is a schematic structural diagram of user equipment according to an embodiment of this application.

When the processing module 1502 is a processor, the communications module 1503 is a transceiver, and the storage module 1501 is a memory, the user equipment in this embodiment of this application may be user equipment shown in FIG. 16.

As shown in FIG. 16, the user equipment 160 includes a processor 1601, a transceiver 1602, a memory 1603, and a bus 1604. The transceiver 1602, the processor 1601, and the memory 1603 are connected by using the bus 1604. The bus 1604 may be a Peripheral Component Interconnect (Peripheral Component Interconnect, PCI) bus, an Extended Industry Standard Architecture (Extended Industry Standard Architecture, EISA) bus, or the like. The bus may be classified into an address bus, a data bus, a control bus, and the like. For ease of representation, only one thick line is used to represent the bus in FIG. 16, but this does not mean that there is only one bus or only one type of bus.

Figure 17:
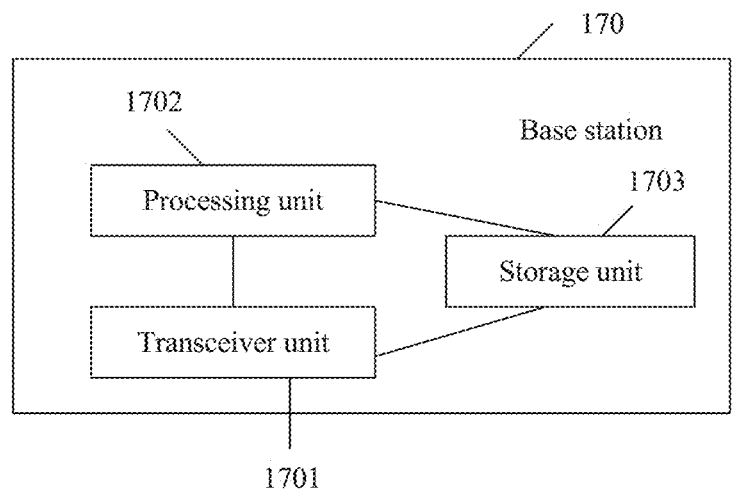
FIG. 17 is a schematic structural diagram of a base station according to an embodiment of this application.

When the functional modules are divided by using the corresponding functions, FIG. 17 is a possible schematic structural diagram of a base station in the foregoing embodiments. A base station 170 includes a transceiver unit 1701, a processing unit 1702, and a storage unit 1703. The transceiver unit 1701 is configured to send signaling, for example, first signaling, second signaling, third signaling, and the like in the method embodiment to user equipment, is configured to: receive physical uplink control signaling sent by the user equipment, or receive an SR, or receive physical uplink control signaling and an SR that is carried or indicated, and is configured to exchange signaling with the user equipment. For details, refer to the foregoing method embodiments. The processing unit 1702 is configured to determine content of the signaling sent to the user equipment. The storage unit 1703 is configured to store data of the base station and a program used by the base station to perform the method. All related content of the foregoing method embodiments may be cited in function descriptions of a corresponding functional module. Details are not described herein again.

Figure 18:
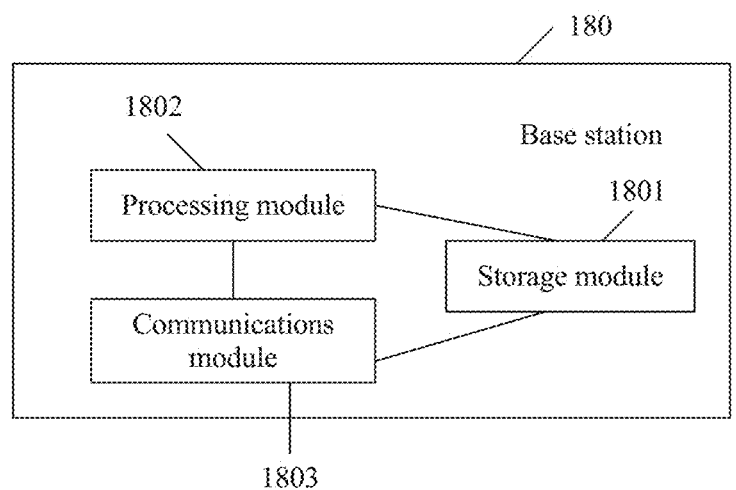
FIG. 18 is a schematic structural diagram of a base station according to an embodiment of this application.

When an integrated unit is used, FIG. 18 is a possible schematic structural diagram of a base station in the foregoing embodiments. A base station 180 includes a processing module 1802 and a communications module 1803. The processing module 1802 is configured to control and manage actions of the base station. For example, the processing module 1802 is configured to support the base station in determining how UE transmits an SR. For details, refer to the method description in the foregoing embodiments. The communications module 1803 is configured to support communication between the base station and another network entity, for example, communication between the base station and a functional module of the user equipment or a network entity. The base station may further include a storage module 1801, configured to store program code and data of the base station.

The processing module 1802 may be a processor or a controller, for example, may be a central processing unit CPU, a general-purpose processor, a digital signal processor DSP, an application-specific integrated circuit ASIC, a field-programmable gate array FPGA or another programmable logical device, a transistor logical device, a hardware component, or any combination thereof. The controller/processor may implement or execute various example logical blocks, modules, and circuits described with reference to content disclosed in this application. Alternatively, the processor may be a combination implementing a computing function, for example, a combination of one or more microprocessors, or a combination of the DSP and a microprocessor. The communications module 1803 may be a transceiver, a transceiver circuit, a communications interface, or the like. The storage module 1801 may be a memory.

Figure 19:
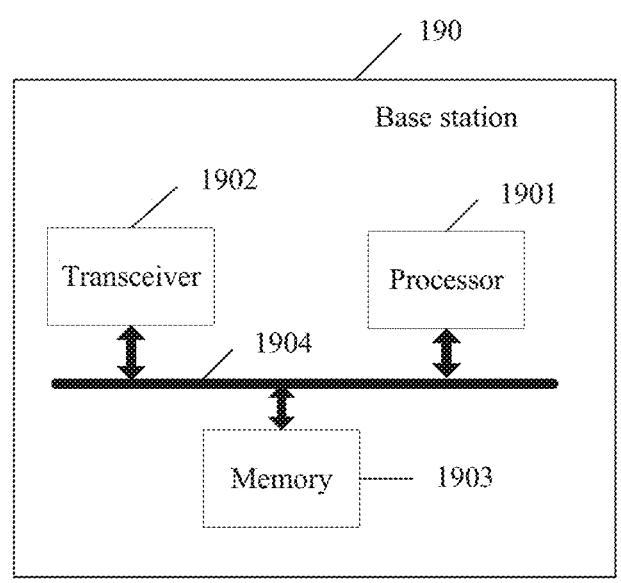
FIG. 19 is a schematic structural diagram of a base station according to an embodiment of this application.

When the processing module 1802 is a processor, the communications module 1803 is a transceiver, and the storage module 1801 is a memory, the base station in this embodiment of this application may be a base station shown in FIG. 19.

As shown in FIG. 19, the base station 190 includes a processor 1901, a transceiver 1902, a memory 1903, and a bus 1904. The transceiver 1902, the processor 1901, and the memory 1903 are connected by using the bus 1904. The bus 1904 may be a Peripheral Component Interconnect PCI bus, an Extended industry Standard Architecture EISA bus, or the like. The bus may be classified into an address bus, a data bus, a control bus, and the like. For ease of representation, only one thick line is used to represent the bus in FIG. 19, but this does not mean that there is only one bus or only one type of bus.

Method or algorithm steps described with reference to the content disclosed in this application may be implemented by hardware, or may be implemented by a processor by executing a software instruction. The software instruction may include a corresponding software module. The software module may be stored in a random access memory (Random Access Memory, RAM), a flash memory, a read only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A resource request sending method, wherein a first-format resource request (SR) resource and a second-format SR resource are configured in a slot, each of the first-format SR resource and the second-format SR resource occupies only one or two symbols in the slot, and a quantity of symbols occupied by the second-format SR resource is greater than a quantity of symbols occupied by the first-format SR resource, and the method comprises:
   transmitting, by user equipment (UE), an SR on the second-format SR resource; or
   if physical uplink control signaling is transmitted in a symbol of the second-format SR resource, and a format of the physical uplink control signaling is capable to carry or indicate the SR, transmitting, by the UE, the physical uplink control signaling and carrying or indicating the SR on the second-format SR resource; or
   if physical uplink control signaling is transmitted in a symbol of the second-format SR resource, and a format of the physical uplink control signaling is not capable to carry or indicate the SR, transmitting, by the UE, the SR on the first-format SR resource, wherein:
   a resource of the physical uplink control signaling is further configured in the slot, the physical uplink control signaling is first-format physical uplink control signaling or second-format physical uplink control signaling, a quantity of symbols occupied by a resource of the second-format physical uplink control signaling is greater than a quantity of symbols occupied by a resource of the first-format physical uplink control signaling, and the physical uplink control signaling transmitted on the second-format SR resource is the second-format physical uplink control signaling; and
   before the transmitting, by the UE, the SR, the method further comprises:
   receiving, by the UE, first signaling from a base station, wherein the first signaling comprises the first-format SR resource and the second-format SR resource; and
   receiving, by the UE, second signaling from the base station, wherein if the second signaling is used to indicate to the UE that no physical uplink control signaling is transmitted on the second-format SR resource, the UE transmits the SR on the second-format SR resource; or
   if the physical uplink control signaling is transmitted on the second-format SR resource and the physical uplink control signaling is capable to carry or indicate the SR, the UE transmits the physical uplink control signaling and carries or indicates the SR on the second-format SR resource; or
   if the physical uplink control signaling is transmitted on the second-format SR resource and the physical uplink control signaling is not capable to carry or indicate the SR, the UE transmits the SR on the first-format SR resource.

* * * * *